US010776948B1

(12) United States Patent
Parisotto et al.

(10) Patent No.: US 10,776,948 B1
(45) Date of Patent: Sep. 15, 2020

(54) METHOD AND DEVICE FOR IMPROVED LOCALIZATION AND MAPPING

(71) Applicant: Apple Inc., Cupertino, CA (US)

(72) Inventors: Emilio Parisotto, Pittsburgh, PA (US); Jian Zhang, Cupertino, CA (US); Ruslan Salakhutdinov, Pittsburgh, PA (US); Devendra Singh Chaplot, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 240 days.

(21) Appl. No.: 16/113,647

(22) Filed: Aug. 27, 2018

Related U.S. Application Data

(60) Provisional application No. 62/554,001, filed on Sep. 4, 2017.

(51) Int. Cl.
| | |
|---|---|
| *G06T 7/73* | (2017.01) |
| *G01C 21/32* | (2006.01) |
| *H04W 64/00* | (2009.01) |
| *G06N 3/08* | (2006.01) |
| *G06N 5/04* | (2006.01) |
| *G06N 3/04* | (2006.01) |

(52) U.S. Cl.
CPC ............. *G06T 7/74* (2017.01); *G01C 21/32* (2013.01); *G06N 3/0454* (2013.01); *G06N 3/08* (2013.01); *G06N 5/046* (2013.01); *H04W 64/003* (2013.01); *G06T 2207/20072* (2013.01); *G06T 2207/30244* (2013.01)

(58) Field of Classification Search
None
See application file for complete search history.

(56) References Cited

PUBLICATIONS

Wang S, Clark R, Wen H, Trigoni N. Deepvo: Towards end-to-end visual odometry with deep recurrent convolutional neural networks. In2017 IEEE International Conference on Robotics and Automation (ICRA) May 29, 2017 (pp. 2043-2050). IEEE. (Year: 2017).*
Clark R, Wang S, Wen H, Markham A, Trigoni N. Vinet: Visual-inertial odometry as a sequence-to-sequence learning problem. InThirty-First AAAI Conference on Artificial Intelligence Feb. 12, 2017. (Year: 2017).*

* cited by examiner

*Primary Examiner* — David Perlman
(74) *Attorney, Agent, or Firm* — Fernando & Partners, LLP

(57) ABSTRACT

In accordance with some embodiments, a method is performed at a device with one or more processors and non-transitory memory. The method includes obtaining location vector data characterizing an object. The method includes determining a neural pose graph associated with a respective time-period based on an initial local pose estimation as a function of respective location vector data. The method includes determining a meta pose estimation associated with the respective time-period by aggregating the neural pose graph associated with the respective time-period and one or more other neural pose graphs associated with one or more temporally adjacent time-periods. The method includes synthesizing a corrected pose estimation by correcting the meta pose estimation associated with the respective time-period based on a function of the meta pose estimation associated with the respective time-period and meta pose estimations associated with one or more temporally adjacent time-periods in order to correct accumulated errors in the initial local pose estimation.

20 Claims, 32 Drawing Sheets

OBJECTIVE

Build an end-to-end model for SLAM

COMPONENTS

Global Pose Optimization 220

Optimize the all local poses estimation jointly by recognizing known areas

Local Pose Estimation 210

Estimate the relative pose change between consecutive frames

METHOD AND DEVICE FOR IMPROVED LOCALIZATION AND MAPPING

CROSS-REFERENCE TO RELATED APPLICATIONS

This application claims priority to U.S. Provisional Patent App. No. 62/554,001, filed on Sep. 4, 2017, and hereby incorporated by reference in its entirety.

TECHNICAL FIELD

The present disclosure relates generally to pose estimation, and more specifically to correcting accumulated errors in a pose estimation.

BACKGROUND

Various simultaneous location and mapping (SLAM) algorithms to estimate the pose of an object suffer from accumulated errors which grow over time. In particular, an error in estimating the pose of an object at a first time results in the same error in estimating the pose of the object at a later time. Further errors made during pose estimation accumulate resulting in greater and greater inaccuracy in the pose estimation.

SUMMARY

In accordance with some implementations, a method is performed at a device with one or more processors and non-transitory memory. The method includes obtaining location vector data characterizing an object at a plurality of time-periods; determining a neural pose graph associated with a respective time-period based on an initial local pose estimation as a function of respective location vector data; determining a meta pose estimation associated with the respective time-period by aggregating the neural pose graph associated with the respective time-period and one or more other neural pose graphs associated with one or more temporally adjacent time-periods; and synthesizing a corrected pose estimation by correcting the meta pose estimation associated with the respective time-period based on a function of the meta pose estimation associated with the respective time-period and meta pose estimations associated with one or more temporally adjacent time-periods in order to correct accumulated errors in the initial local pose estimation.

In accordance with some implementations, a device (e.g., a vehicle, robot, etc.) includes: a locomotive system arranged to move the device; a control system coupled to the locomotive system provided to control the locomotive system in order to manage at least the velocity, acceleration or direction of the device; and a navigation controller coupled to the locomotive system and the control system, wherein the navigation controller is provided to orchestrate the locomotive system by way of the control system in order to move the device. According to some implementations, the navigation controller is provided to: synthesize a corrected pose estimation associated with a respective time-period by correcting a meta pose estimation associated with the respective time-period based on a function of meta pose estimations associated with one or more other temporally adjacent time-periods in order to correct accumulated errors in an initial local pose estimation associated with the respective time-period, wherein the meta pose estimation associated with the respective time is a function of a neural pose graph associated with the respective time-period and one or more other neural pose graphs associated with one or more temporally adjacent time-periods; and instruct the control system to adjust at least one of the velocity, acceleration, or direction of the device based on the corrected local pose estimation.

In accordance with some implementations, a device (e.g., head-mounted device (HMD) provided to present AR/VR content to a user) includes: one or more displays provided to present augmented reality/virtual reality (AR/VR) content; an AR/VR content engine coupled to the one or more displays, the AR/VR content engine to render AR/VR content for presentation by the one or more displays; and a localization and mapping controller coupled to the one or more image sensors and the AR/VR content engine. The localization and mapping controller is provided to: synthesize a corrected pose estimation associated with a respective time-period by correcting a meta pose estimation associated with the respective time-period based on a function of meta pose estimations associated with one or more other temporally adjacent time-periods in order to correct accumulated errors in an initial local pose estimation associated with the respective time-period, wherein the meta pose estimation associated with the respective time is a function of a neural pose graph associated with the respective time-period and one or more other neural pose graphs associated with one or more temporally adjacent time-periods; and instruct the AR/VR content engine to adjust the AR/VR content based on the corrected local pose estimation.

In accordance with some implementations, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a device, cause the device to perform or cause performance of the operations of any of the methods described herein. In accordance with some implementations, a device includes means for performing or causing performance of the operations of any of the methods described herein.

DESCRIPTION

Figure 1:
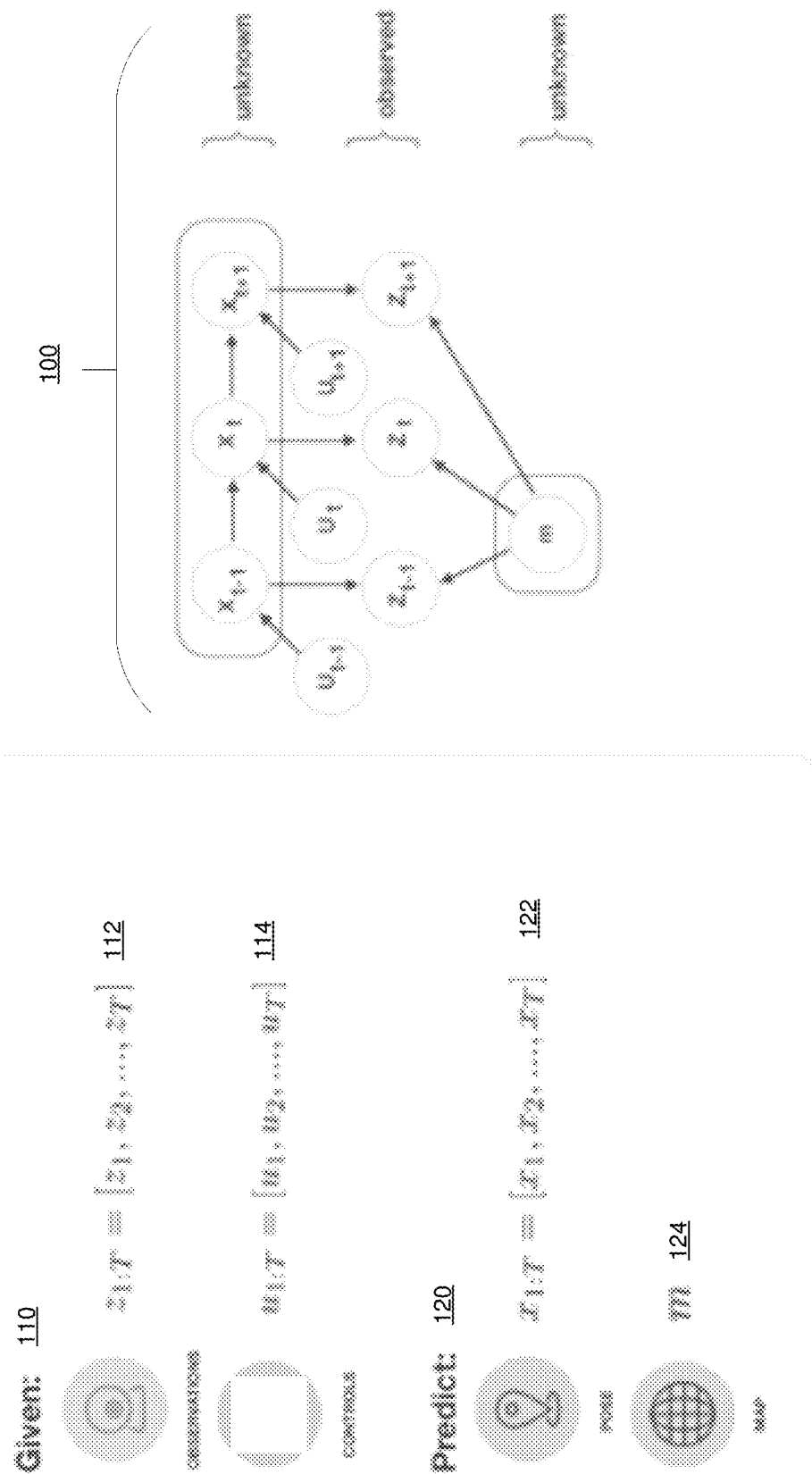
FIG. 1 illustrates an example system of equations for simultaneous localization and mapping (SLAM) of an object in accordance with some implementations.

In embodiments described below, an improved localization and mapping process is described that corrects for errors in local pose estimations that accumulate over. In embodiments described below, the correction operation includes an attention phase and a sequence encoder phase performed across pose estimations associated with various time points. This reduces the deviation between the predicted localization and the ground-truth, which improves the control over a device and mapping of an environment associated with the device. This also reduces power usage and improves battery life of the device by enabling the device to navigate more quickly and efficiently.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

FIG. 1 illustrates an example system of equations 100 for simultaneous localization and mapping (SLAM) of an object in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the system of equations 100 includes a plurality of known information 110 and a plurality of predicted (e.g., unknown) information 122. For example, the SLAM process is performed relative to some object (e.g., a vehicle, robot, etc.) in order to obtain a map of an environment and localize the object within the map of the environment. In some implementations, the SLAM process is performed by an autonomous vehicle, robot, or the like. In some implementations, the SLAM process is performed by a controller node that assists a semi-autonomous vehicle, robot, or the like.

As shown in FIG. 1, the plurality of known information 110 includes observation data 112 ($z_1, z_2, \ldots, z_t$) at various time points and control data 114 ($u_1, u_2, \ldots, u_t$) at various time points. For example, the observation data 112 includes image data, environmental data, and/or the like. For example, the control data 114 includes data associated with the object such as steering controls, acceleration, velocity, and/or the like.

As shown in FIG. 1, the plurality of predicted information 120 includes pose data 122 ($x_1, x_2, \ldots, x_t$) at various time points and map data 124 ($m$). For example, the pose data 122 corresponds to local pose estimations for the object within the environment such as localization data. For example, the map data 124 corresponds to a layout of the environment.

Figure 2:
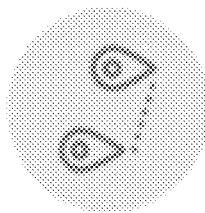
FIG. 2 indicates the objective and components of a modified SLAM system in accordance with some implementations.
Figure 2:
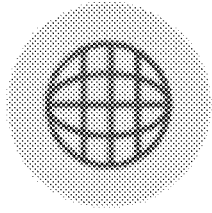

FIG. 2 indicates the objective and components of a modified SLAM system in accordance with some implementations. As shown in FIG. 2, the components of the SLAM system include local pose estimation 210 and global pose estimations 220.

Figure 3:
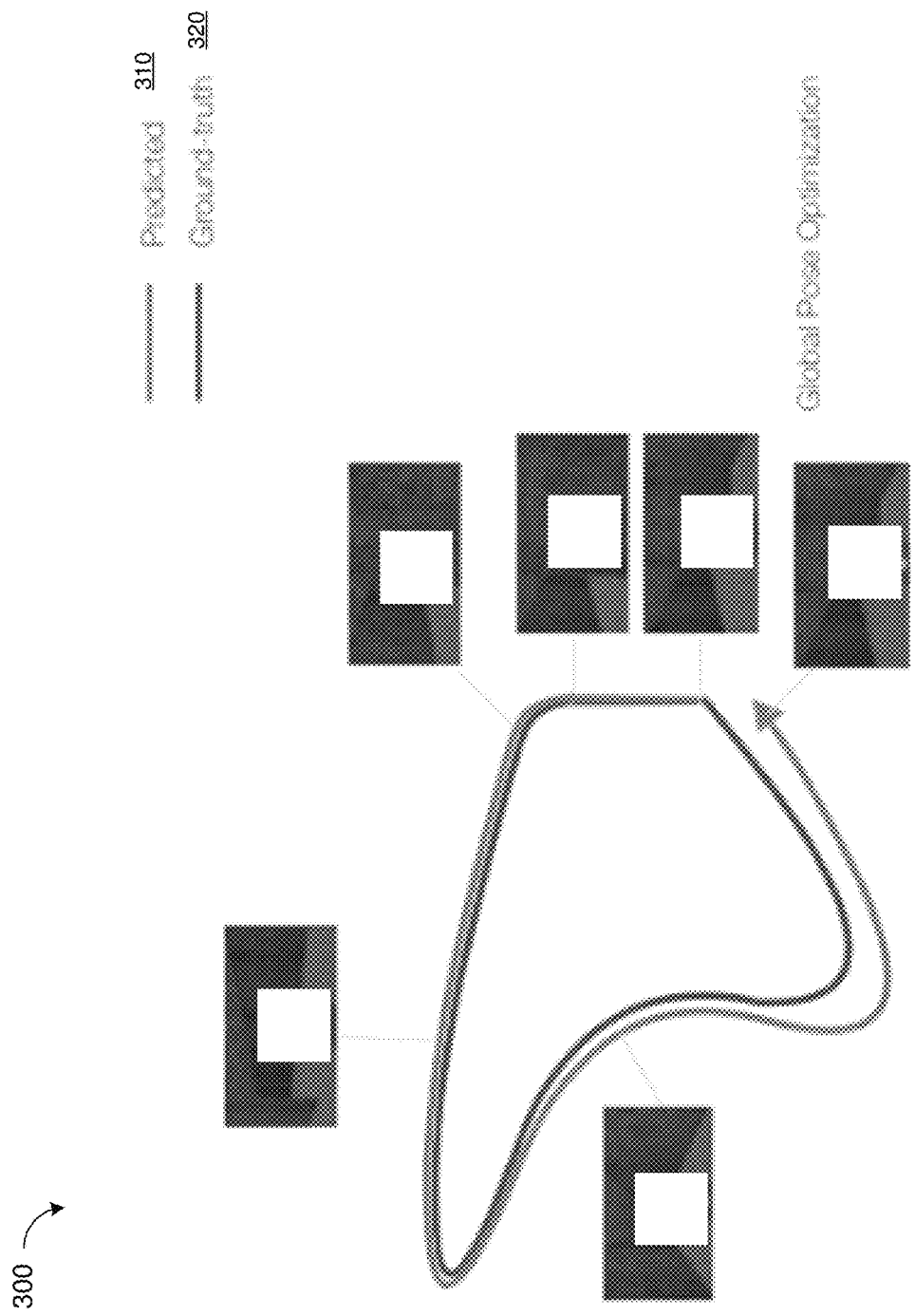
FIG. 3 illustrates an example simulation in accordance with some implementations.

FIG. 3 illustrates an example simulation 300 in accordance with some implementations. As shown in FIG. 3, the example scenario 300 shows the predicted path 310 (e.g., determined by the SLAM process) and the ground-truth 320.

Figure 4:
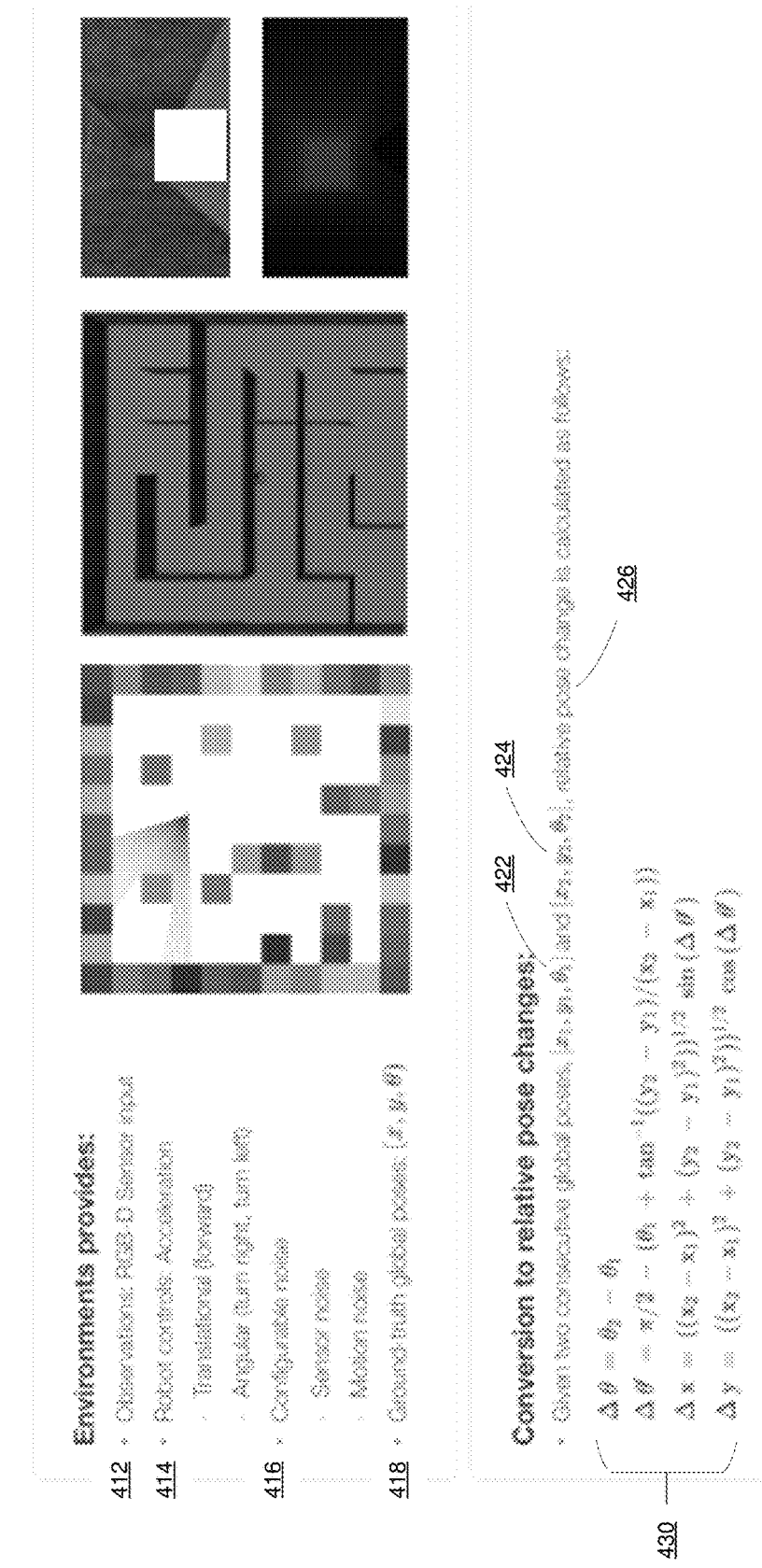
FIG. 4 illustrates an example SLAM process in accordance with some implementations.

FIG. 4 illustrates an example SLAM process 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the SLAM process 400 determines global poses 422 and 424 for consecutive time-periods based at least in part on observations 412, controls 414, configurable noise 416, and/or ground-truth global poses 418. As shown in FIG. 4, the SLAM process 400 determines a relative pose change 426 based on global poses 422 and 424 according to the system of equation 430.

Figure 5:
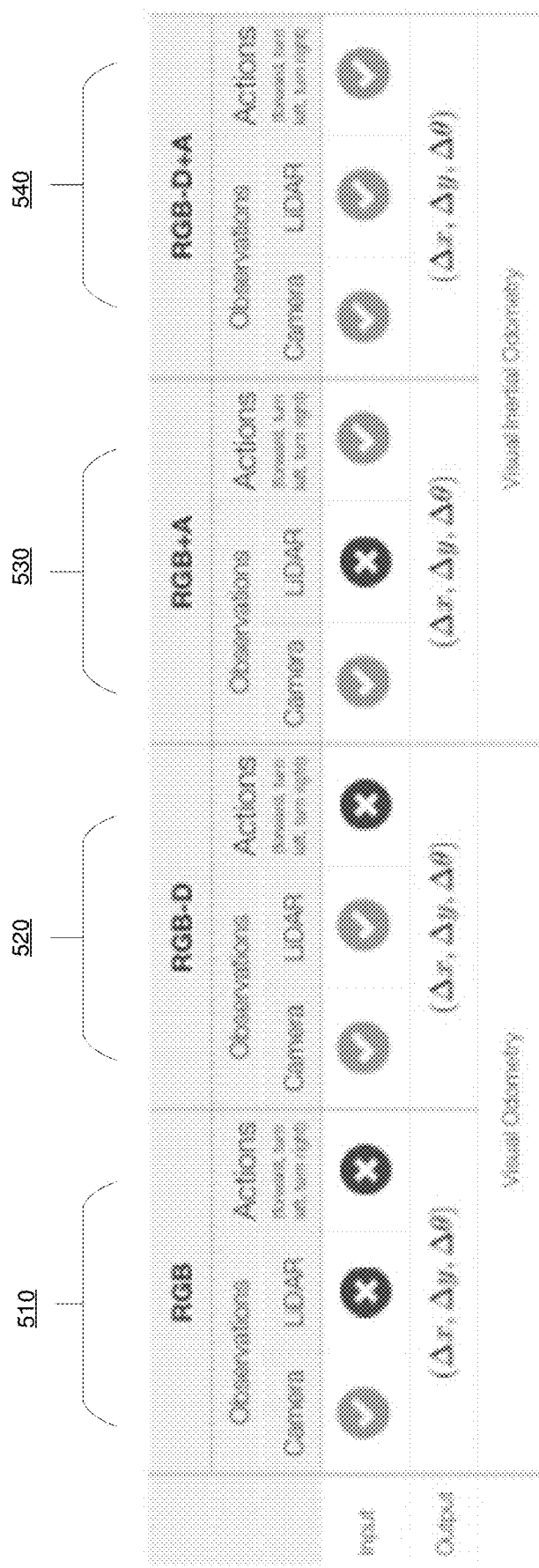
FIG. 5 illustrates various data sets that may be used as input data for the SLAM process in accordance with some implementations.

FIG. 5 illustrates various data sets 510, 520, 530, and 540 that may be used as input data for the SLAM process in accordance with some implementations. As shown in FIG. 5, the data set 510 includes camera (e.g., image sensor) data. The data set 520 includes camera data and LiDAR data. The data set 530 includes camera data and action data (e.g., control information). The data set 540 includes camera data, LiDAR data, and action data.

Figure 6:
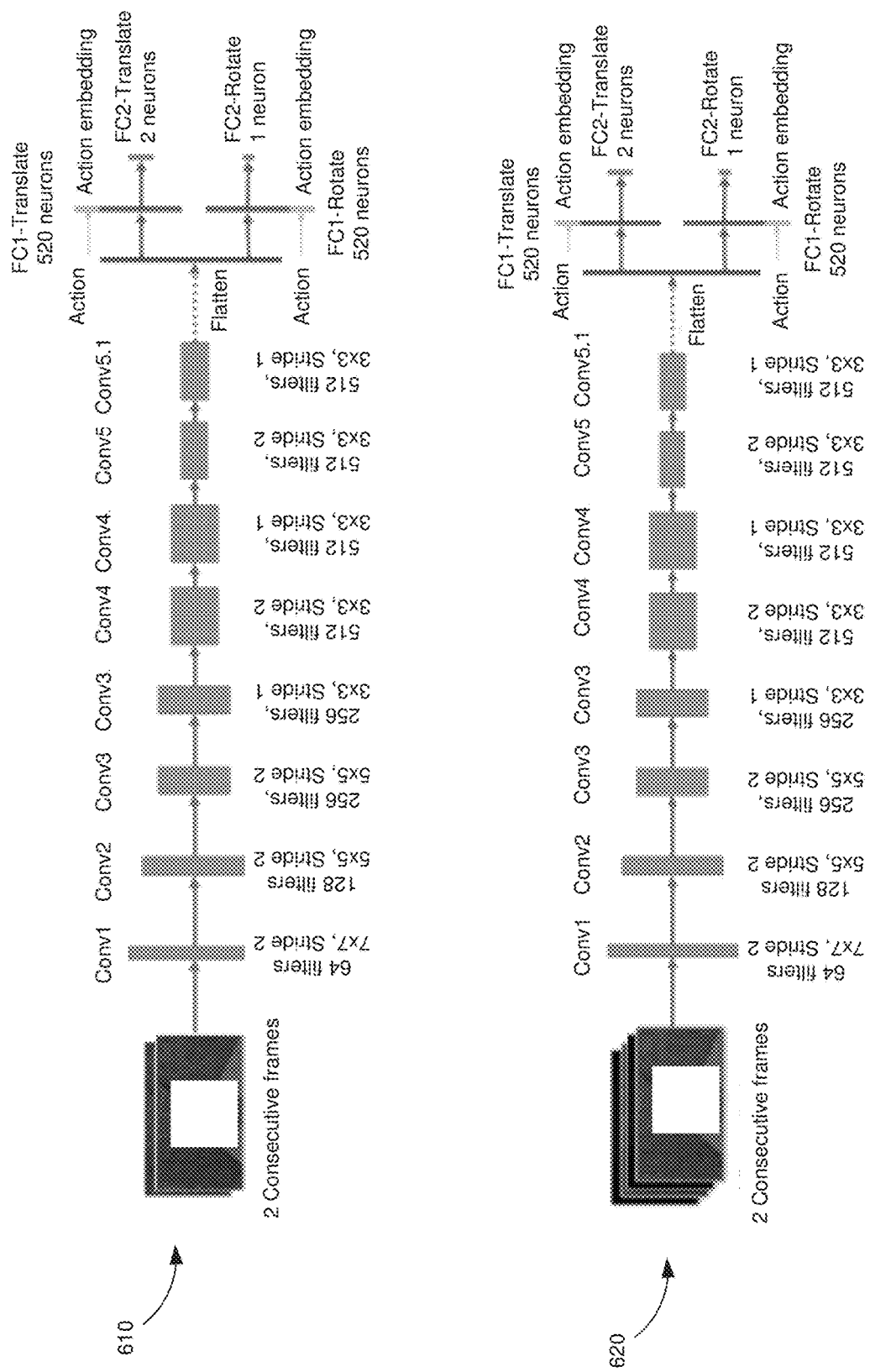
FIG. 6 illustrates various neural networks used by the SLAM process in accordance with some implementations.

FIG. 6 illustrates various neural networks 610 and 620 used by the SLAM process in accordance with some implementations.

Figure 7:
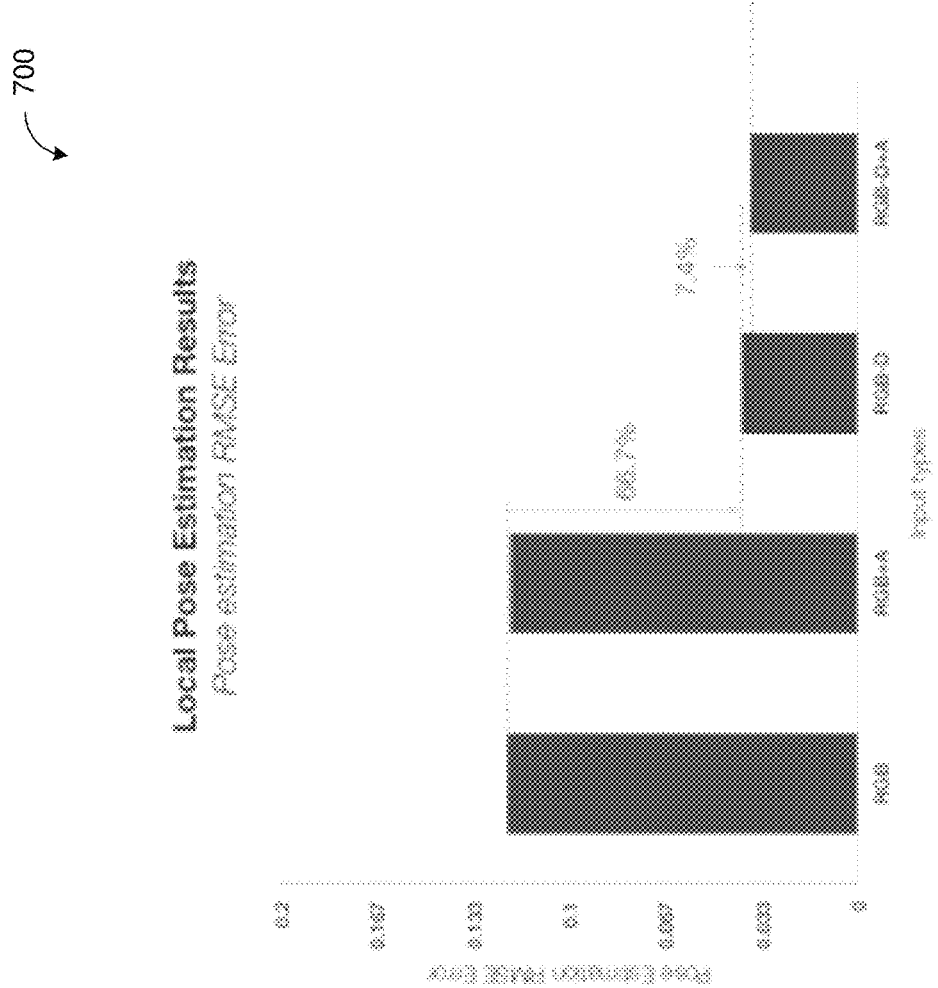
FIG. 7 illustrates local pose estimation results after one epoch (e.g., a count of training iterations) for each of the data sets described in FIG. 5 in accordance with some implementations.

FIG. 7 illustrates local pose estimation results 700 after one epoch (e.g., a count of training iterations) for each of the data sets 510, 520, 530, and 540 described in FIG. 5 in accordance with some implementations.

Figure 8:
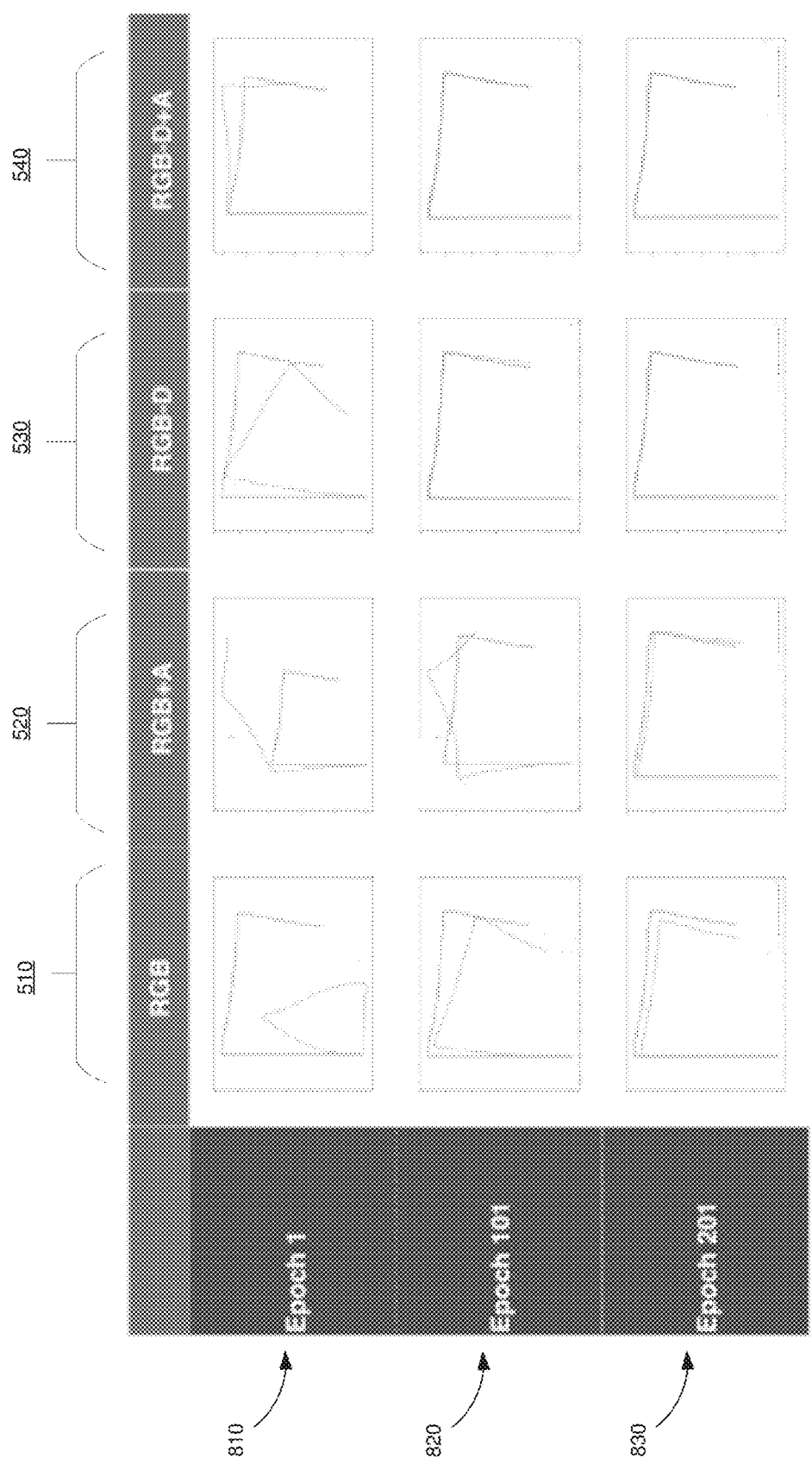
FIG. 8 illustrates sets of results after one epoch, 101 epochs, and 201 epochs in accordance with some implementations.

FIG. 8 illustrates a set of results 810 after one epoch (e.g., the count of training iterations) for each of the data sets 510, 520, 530, and 540 in accordance with some implementations. FIG. 8 also illustrates a set of results 820 after 101 epochs (e.g., the count of training iterations) for each of the data sets 510, 520, 530, and 540 in accordance with some implementations. FIG. 8 further illustrates a set of results 830 after 201 epochs (e.g., the count of training iterations) for each of the data sets 510, 520, 530, and 540 in accordance with some implementations.

Figure 9:
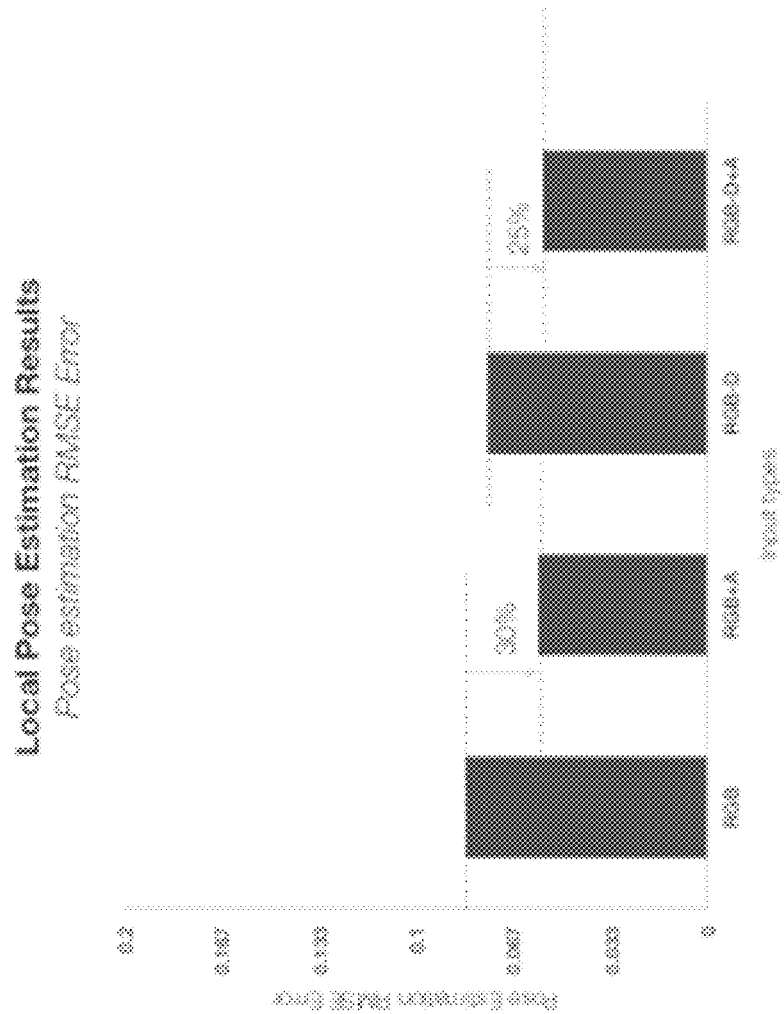
FIG. 9 illustrates local pose estimation results after 201 epochs for each of the data sets described in FIG. 5 in accordance with some implementations.

FIG. 9 illustrates local pose estimation results 900 after 201 epochs (e.g., the count of training iterations) for each of the data sets 510, 520, 530, and 540 described in FIG. 5 in accordance with some implementations.

Figure 10:
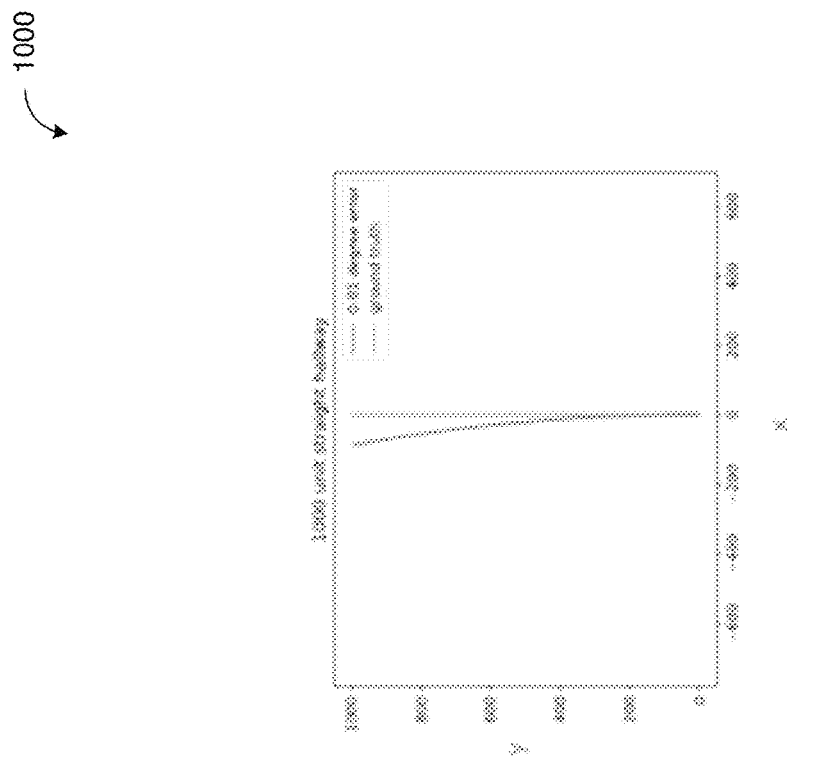
FIG. 10 illustrates an example drift scenario associated with the local pose estimation in accordance with some implementations.
Figure 11:
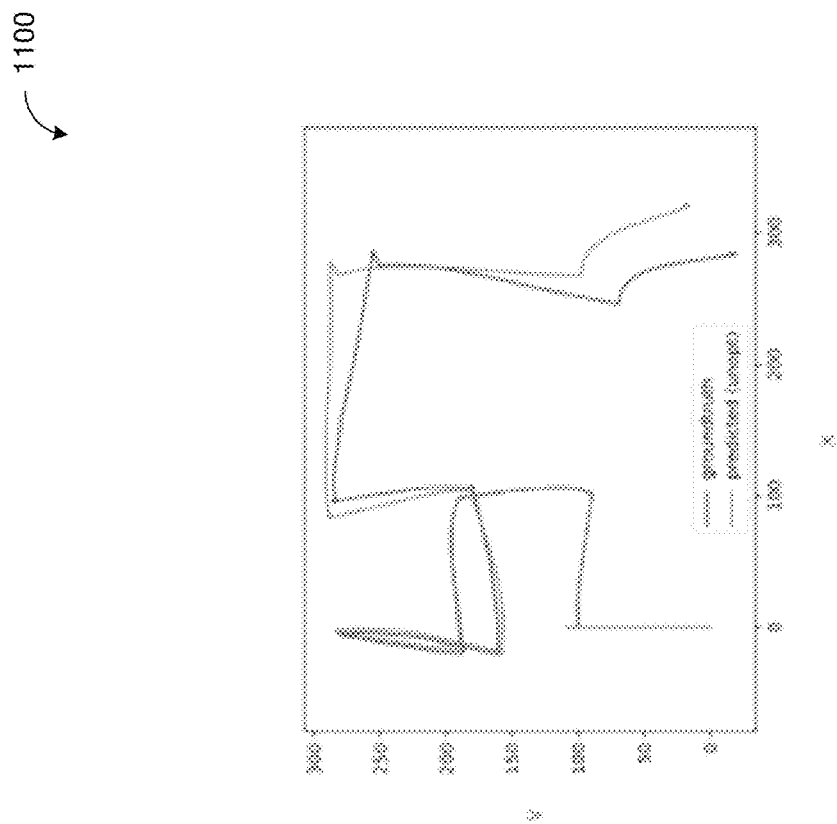
FIG. 11 illustrates an example global error scenario while performing the SLAM process in accordance with some implementations.
Figure 12:
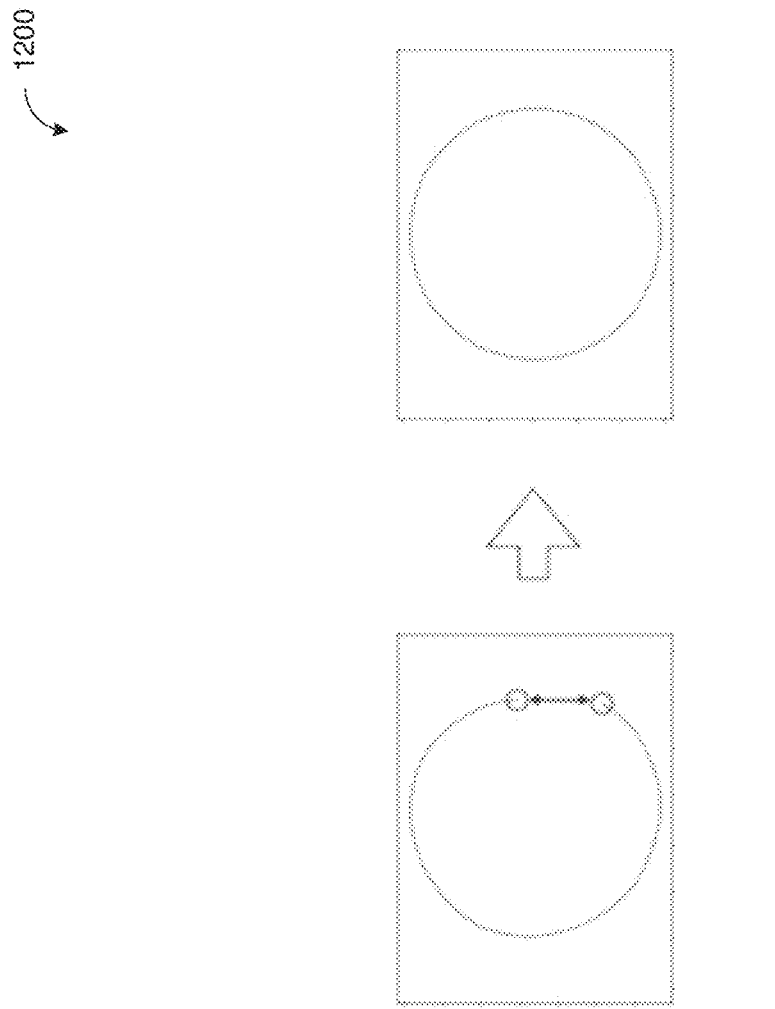
FIG. 12 illustrates an example loop closure scenario in accordance with some implementations.

FIG. 10 illustrates an example drift scenario 1000 associated with the local pose estimation in accordance with some implementations. FIG. 11 illustrates an example global error scenario 1200 while performing the SLAM process in accordance with some implementations. FIG. 12 illustrates an example loop closure scenario 1200 in accordance with some implementations.

Figure 13:
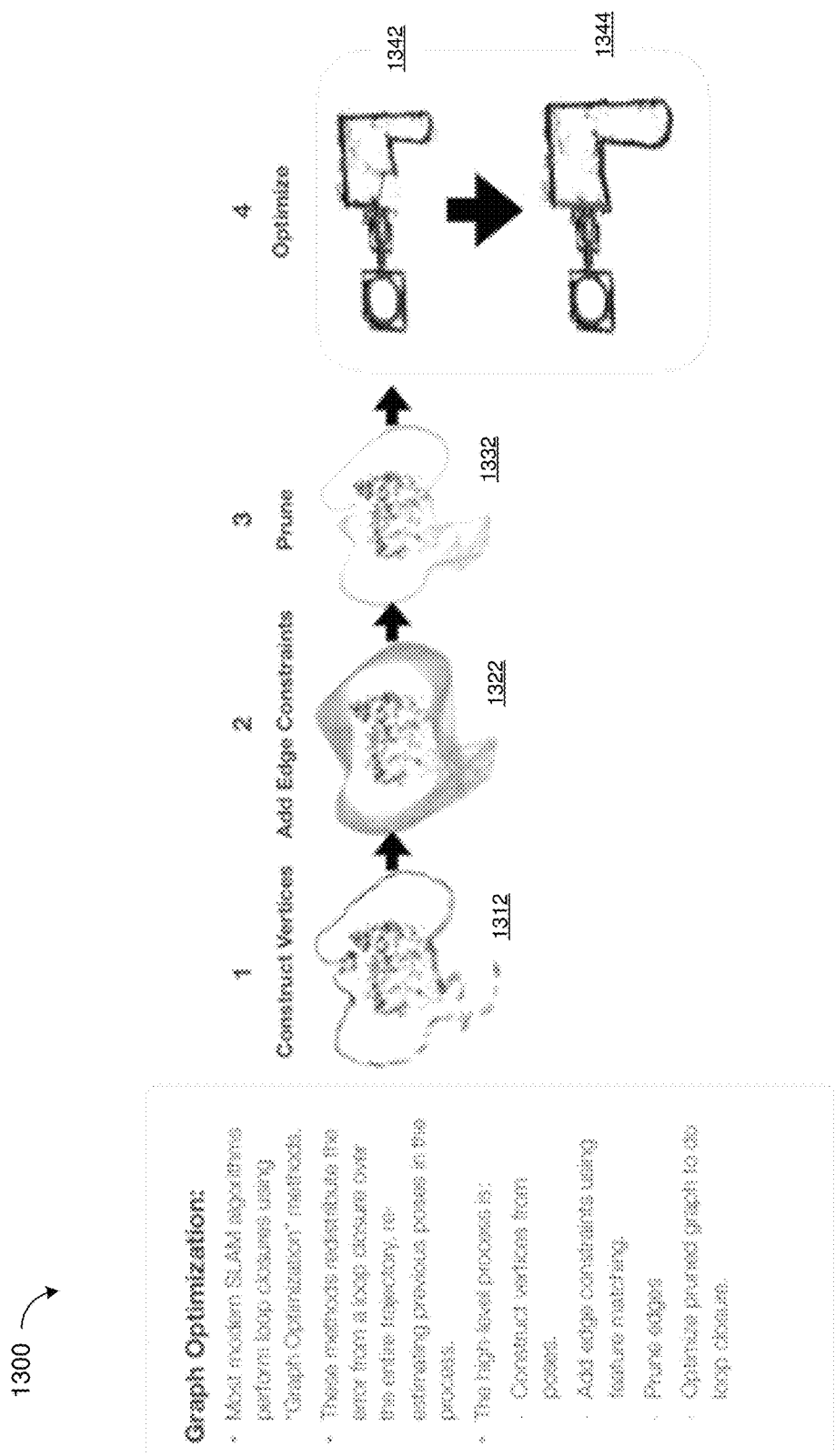
FIG. 13 illustrates an example graph optimization scenario in accordance with some implementations.
Figure 15:
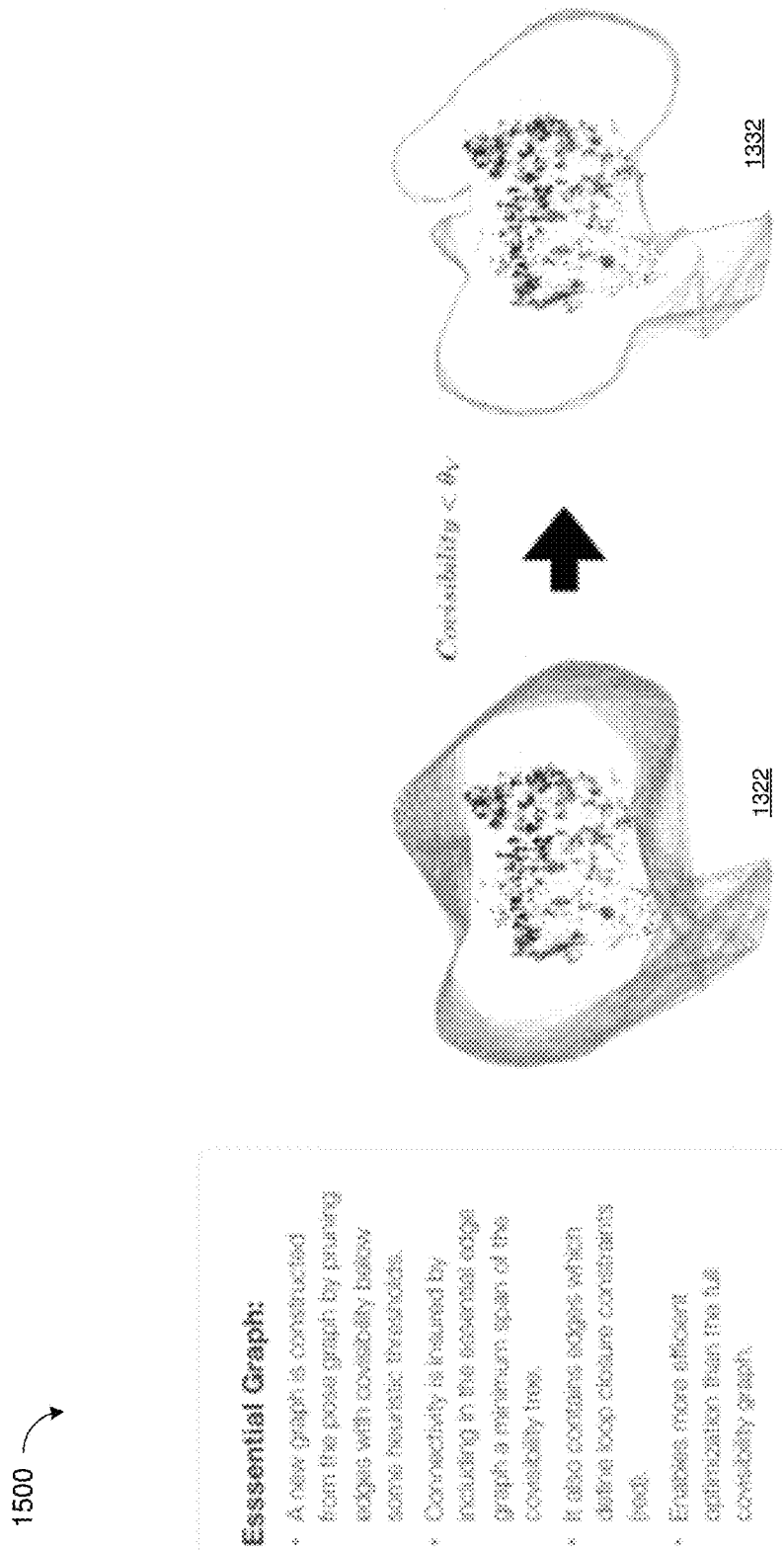
FIG. 15 illustrates a pruning process where one graph is generated by pruning the edges of another the graph in accordance with some implementations.
Figure 16:
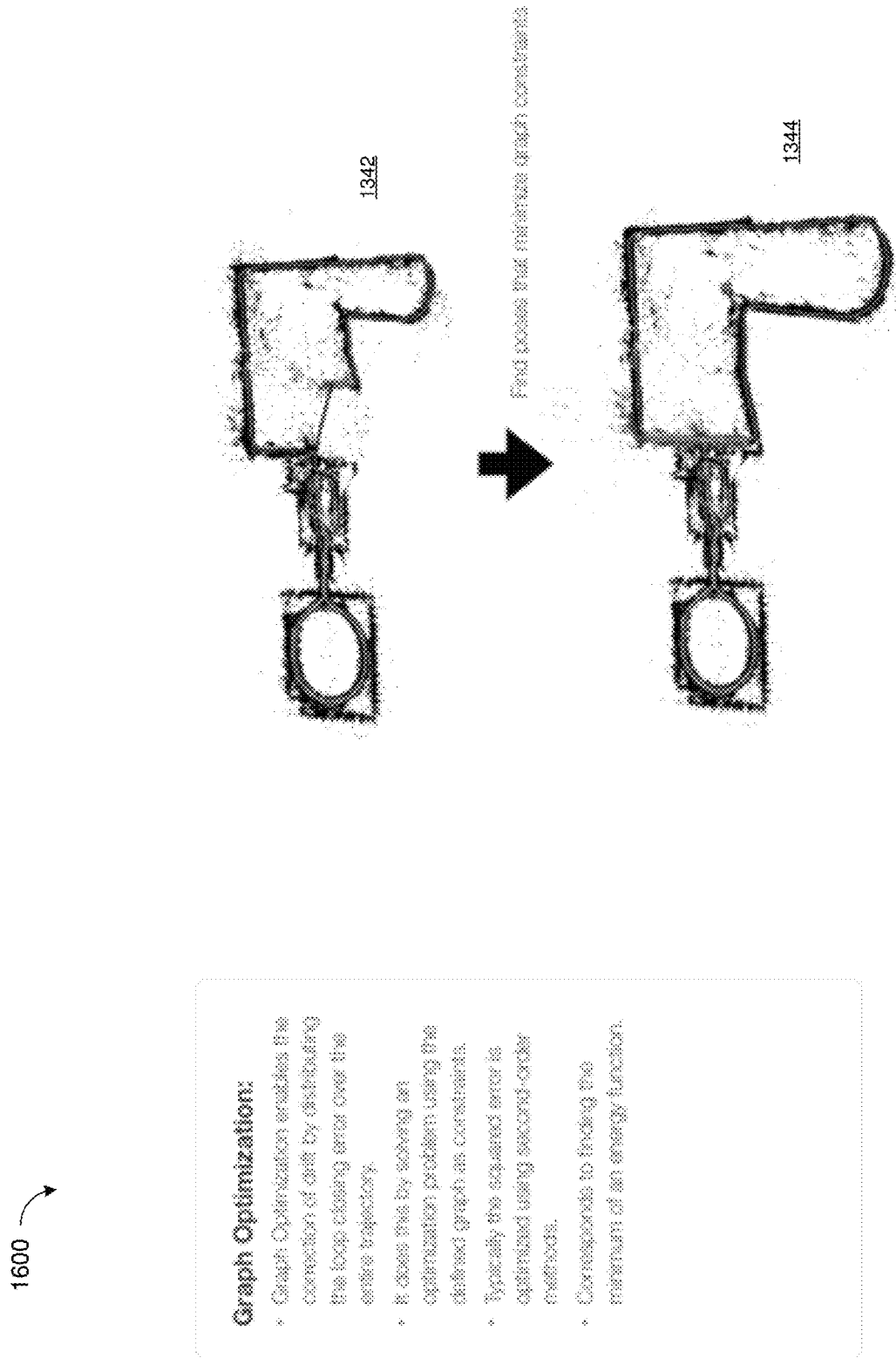
FIG. 16 illustrates a loop closure process where loops are closed between two graphs in accordance with some implementations.
Figure 17:
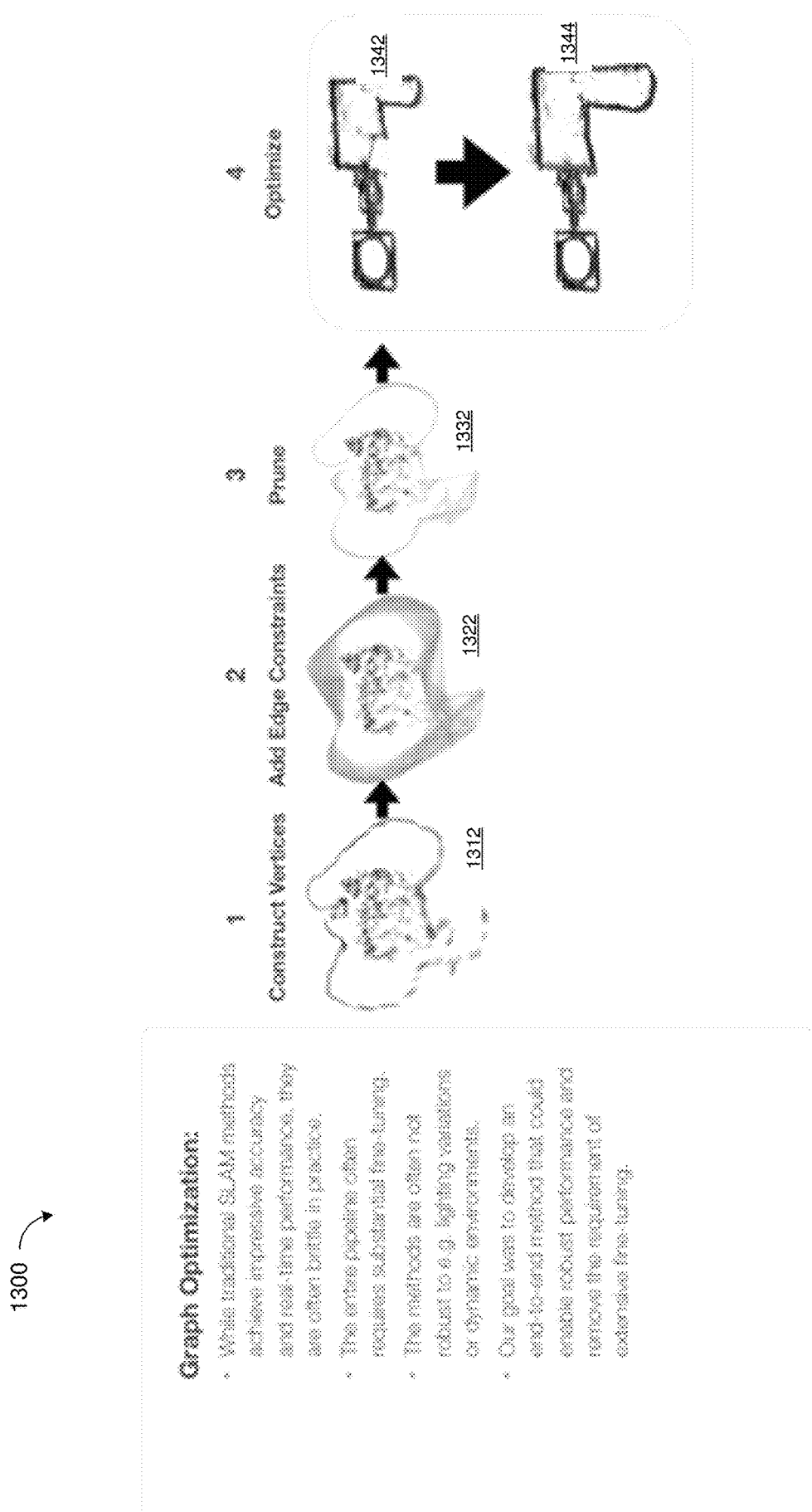
FIG. 17 illustrates another example graph optimization scenario in accordance with some implementations.

FIGS. 13 and 17 illustrate an example graph optimization scenario 1300 in accordance with some implementations. As shown in FIG. 13, a graph 1312 is generated by constructing vertices from the poses, a graph 1322 is generated by adding edge constraints to the graph 1312, a graph 1332 is generated by pruning the edges of the graph 1322, and graphs 1342 and 1344 are generated by performing loop closures on the graph 1332. Elements common to FIGS. 13-17 include common reference numbers, and only the differences between FIGS. 13-17 are described herein for the sake of brevity.

Figure 14:
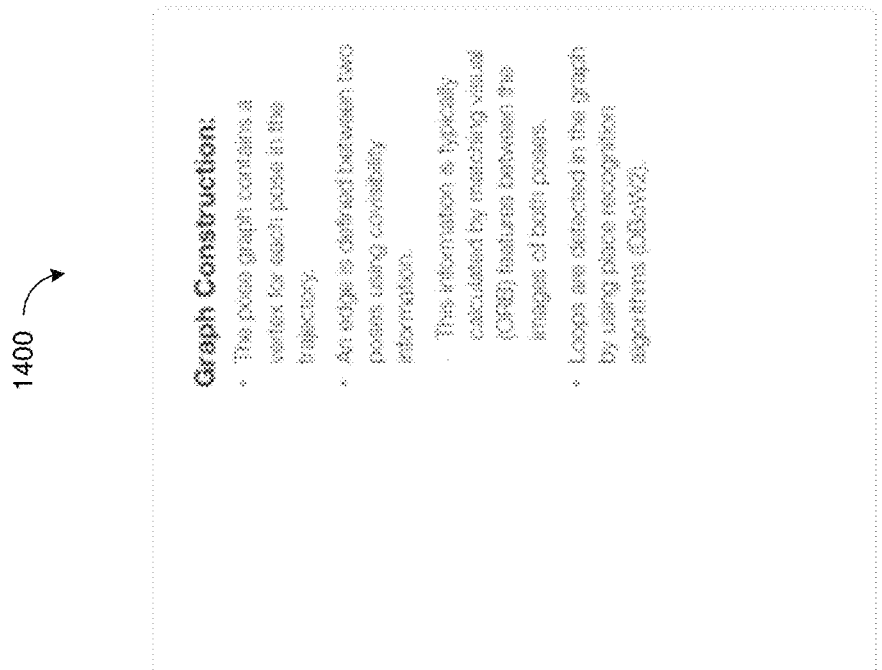
FIG. 14 illustrates an edge constraint process where one graph is generated by adding edge constraints to another graph in accordance with some implementations.

FIG. 14 illustrates an edge constraint process 1400 where the graph 1322 is generated by adding edge constraints to the graph 1312 in accordance with some implementations. FIG. 15 illustrates a pruning process 1500 where the graph 1332 is generated by pruning the edges of the graph 1322 in accordance with some implementations. FIG. 16 illustrates a loop closure process 1600 where loops are closed between the graphs 1342 and 1344 in accordance with some implementations.

Figure 18:
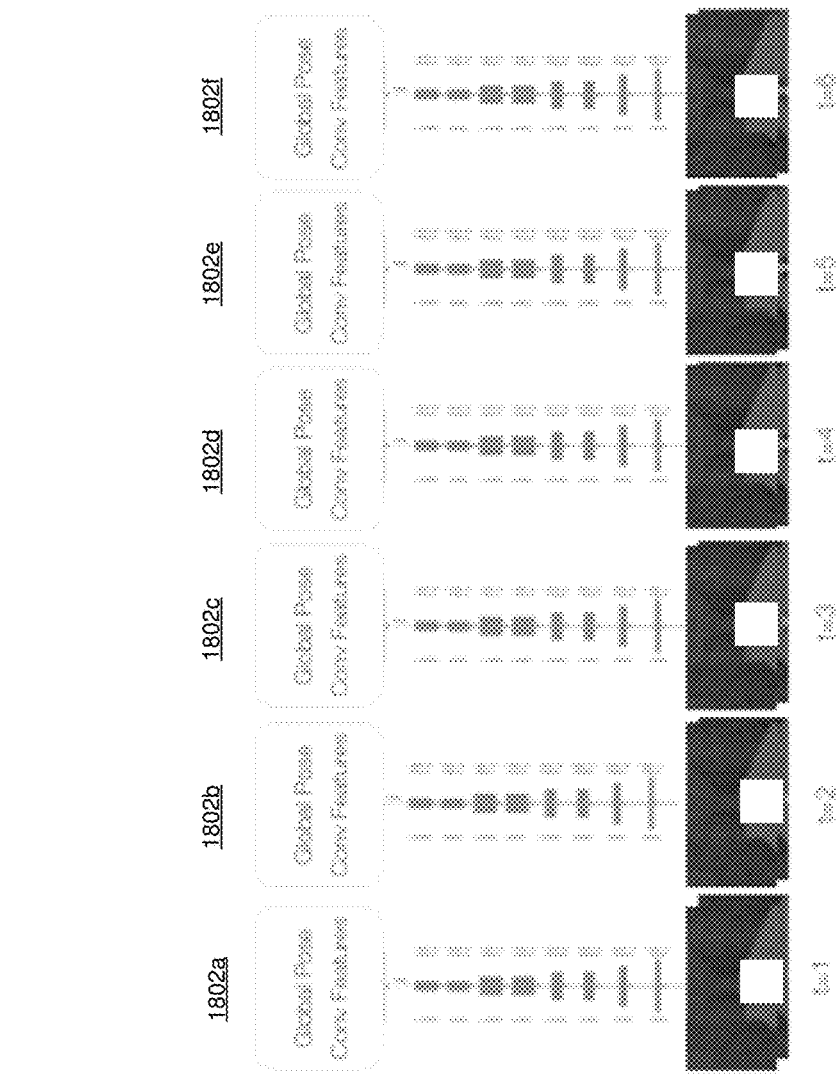
FIG. 18 illustrates a neural pose graph generation process in accordance with some implementations.

FIG. 18 illustrates a neural pose graph generation process 1800 in accordance with some implementations. As shown in FIG. 18, for example, an initial local pose estimation for a first time-period (e.g., t=1) is transformed into a neural pose graph 1802a using a neural network (e.g., one of the neural networks 610 or 620 in FIG. 6). Similarly, the neural pose graphs 1802b, 1802c, 1802d, 1802e, and 1802f are generated for subsequent time-periods.

Figure 19:
FIG. 19 illustrates a meta pose estimation process in accordance with some implementations.

FIG. 19 illustrates a meta pose estimation process 1900 in accordance with some implementations. As shown in FIG. 19, the neural pose graphs 1802a and 1802b for consecutive time-periods (e.g., t=1 and t=2) are aggregated to generate a meta pose estimation 1902a, Similarly, the meta pose estimations 1902b and 1902c are generated for subsequent pairs of time-periods.

Figure 20:
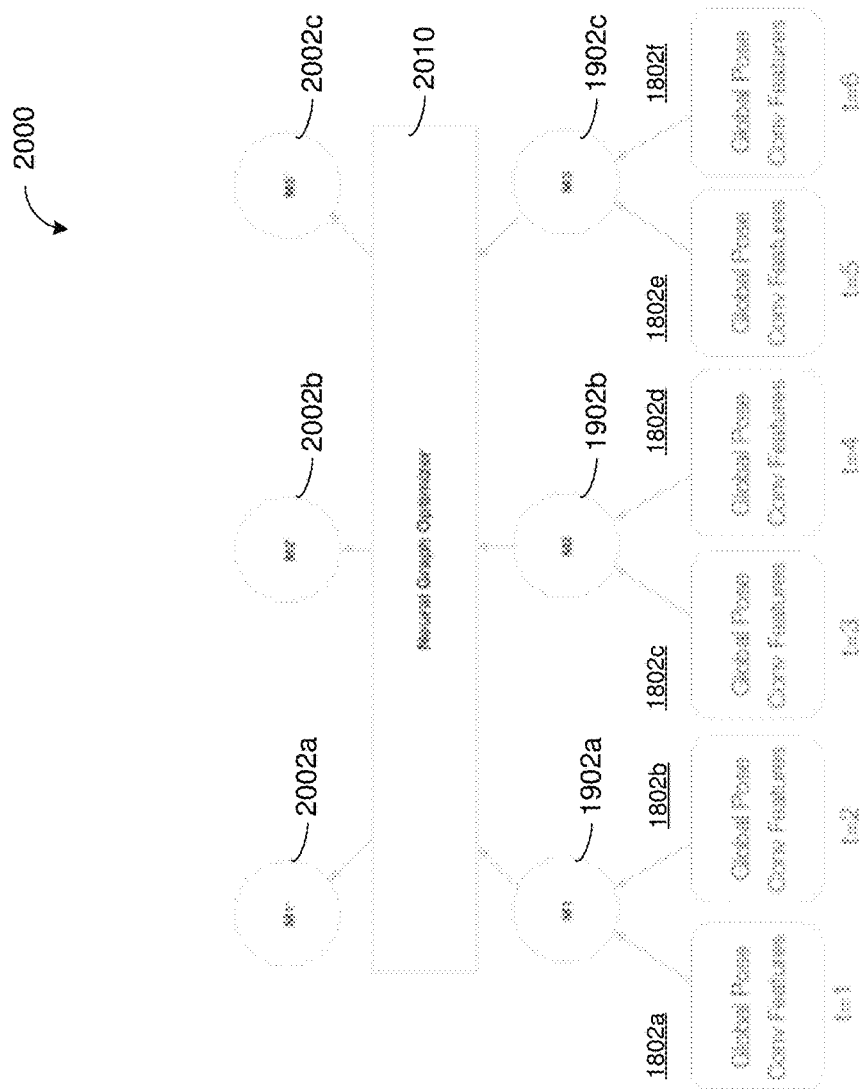
FIG. 20 illustrates a neural graph optimization process in accordance with some implementations.

FIG. 20 illustrates a neural graph optimization process 2000 in accordance with some implementations. As shown in FIG. 20, the neural graph optimizer 2010 generates corrected pose estimations 2002a, 2002b, and 2002c based on meta pose estimations 1902a, 1902b, and 1902c.

Figure 21:
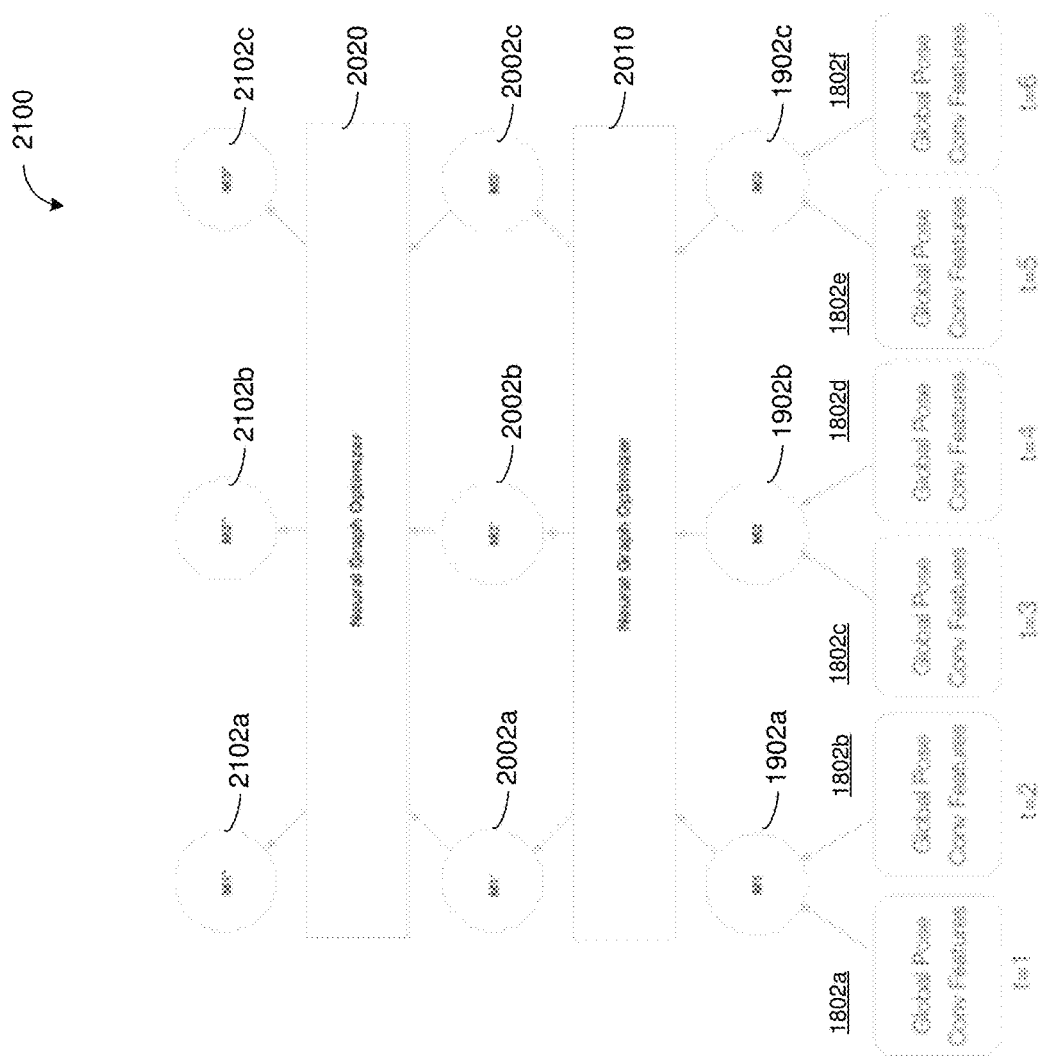
FIG. 21 illustrates a neural graph optimization process in accordance with some implementations.

FIG. 21 illustrates a neural graph optimization process 2100 in accordance with some implementations. As shown in FIG. 21, the neural graph optimizer 2010 generates corrected pose estimations 2002a, 2002b, and 2002c based on meta pose estimations 1902a, 1902b, and 1902c, and the neural graph optimizer 2020 generates corrected pose estimations 2102a, 2102b, and 2102c based on corrected meta pose estimations 2002a, 2002b, and 2002c.

Figure 22:
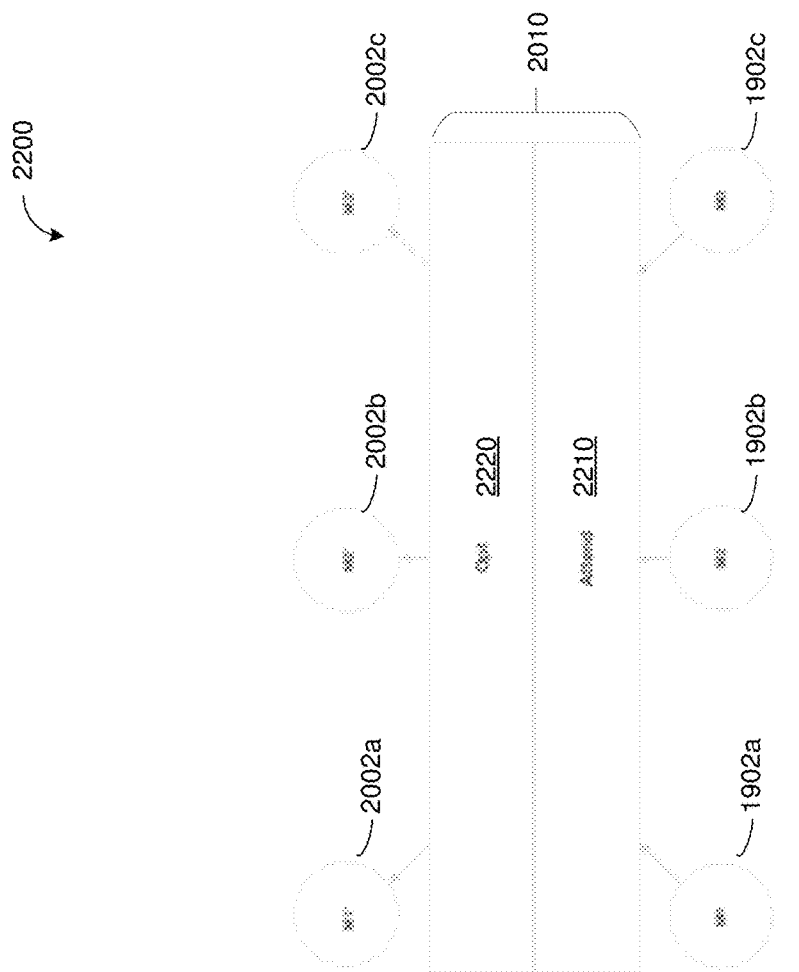
FIG. 22 illustrates a correction process in accordance with some implementations.

FIG. 22 illustrates a correction process 2200 in accordance with some implementations. As shown in FIG. 22, the neural graph optimizer 2010 includes an attention phase 2210 and an optimization phase 2220 (sometimes also referred to herein as the "sequence encoder phase"). Elements common to FIGS. 18-22 include common reference numbers, and only the differences between FIGS. 18-22 are described herein for the sake of brevity.

Figure 23:
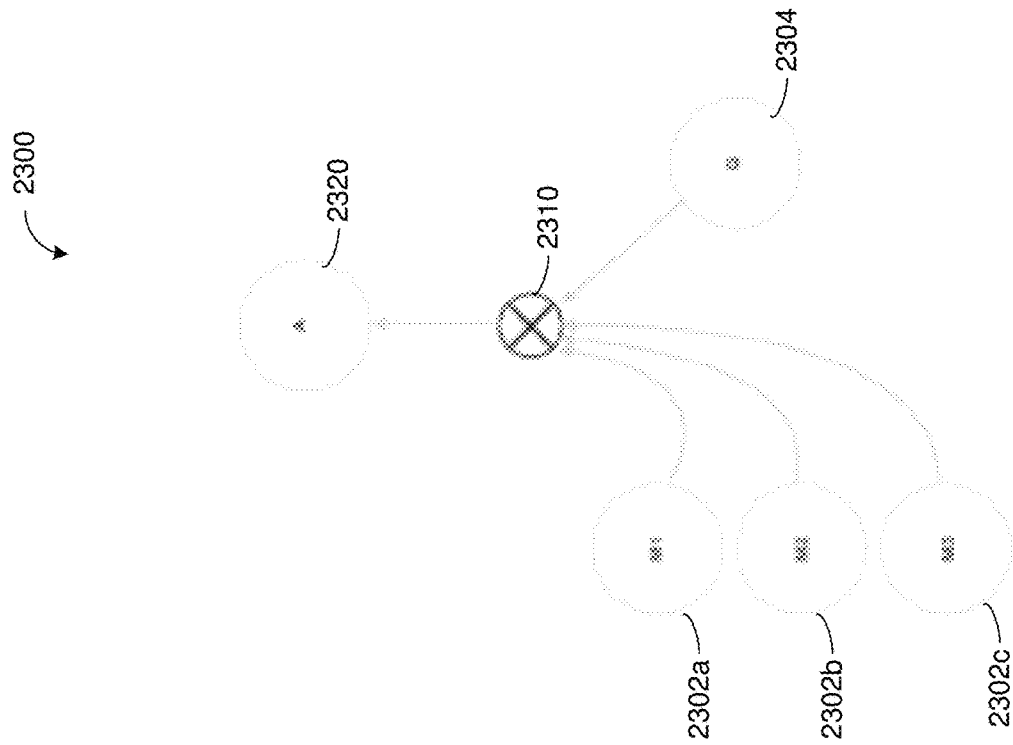
FIG. 23 illustrates an example attention process in accordance with some implementations.
Figure 25:
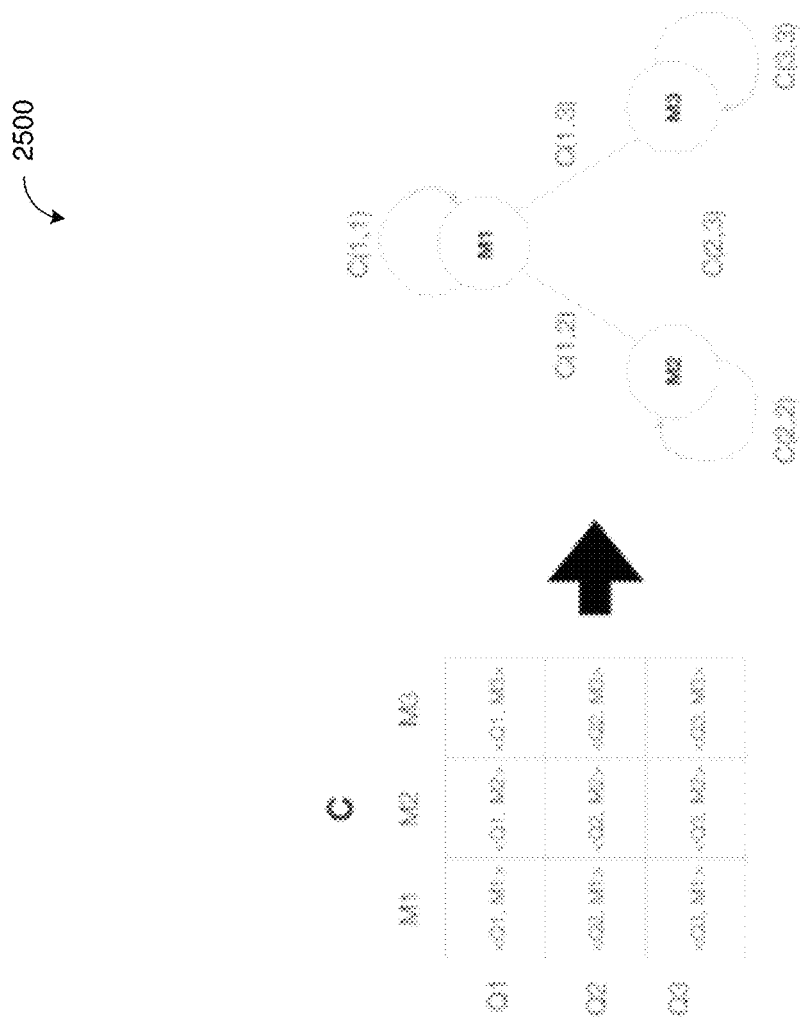
FIG. 25 illustrates an example detailed attention phase in accordance with some implementations.

FIG. 23 illustrates an example attention process 2300 in accordance with some implementations. As shown in FIG. 23, features 2302*a*, 2302*b*, and 2302*c* are combined with a query vector 2304 according to operation 2310 (e.g., dot product, cosine similarity, or the like) to produce a resultant vector 2320. FIG. 25 illustrates an example detailed attention phase 2500 in accordance with some implementations.

Figure 24:
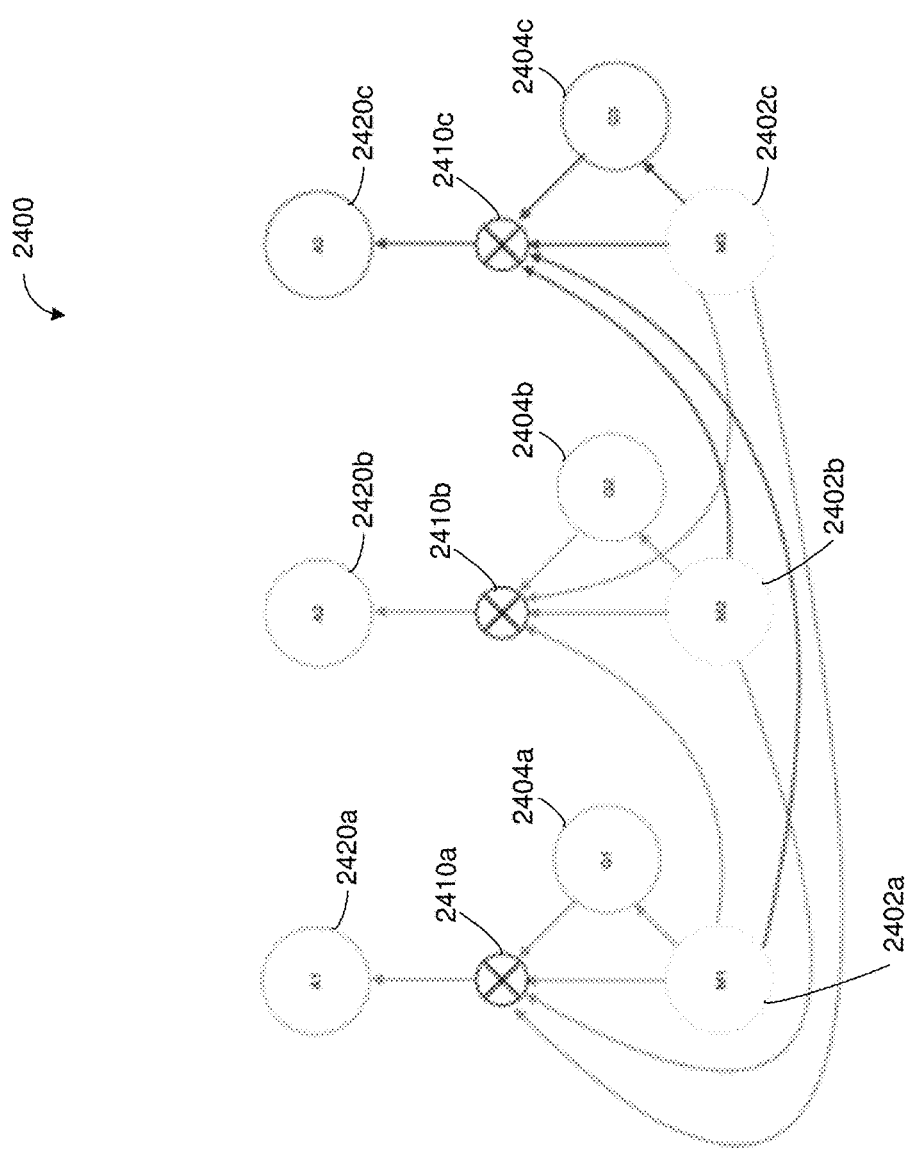
FIG. 24 illustrates an example attention phase in accordance with some implementations.

FIG. 24 illustrates an example attention phase 2400 in accordance with some implementations. As shown in FIG. 24, meta pose estimations 2402*a*, 2402*b*, and 24302*c* are combined with an attention query vector 2404*a* according to operation 2410*a* (e.g., dot product, cosine similarity, or the like) to produce resultant vector 2420*a*. Similarly, the attention phase 2400 also generates resultant vectors 2420*b* and 2420*c*. FIG. 25 illustrates an example detailed attention phase 2500 in accordance with some implementations.

Figure 26:
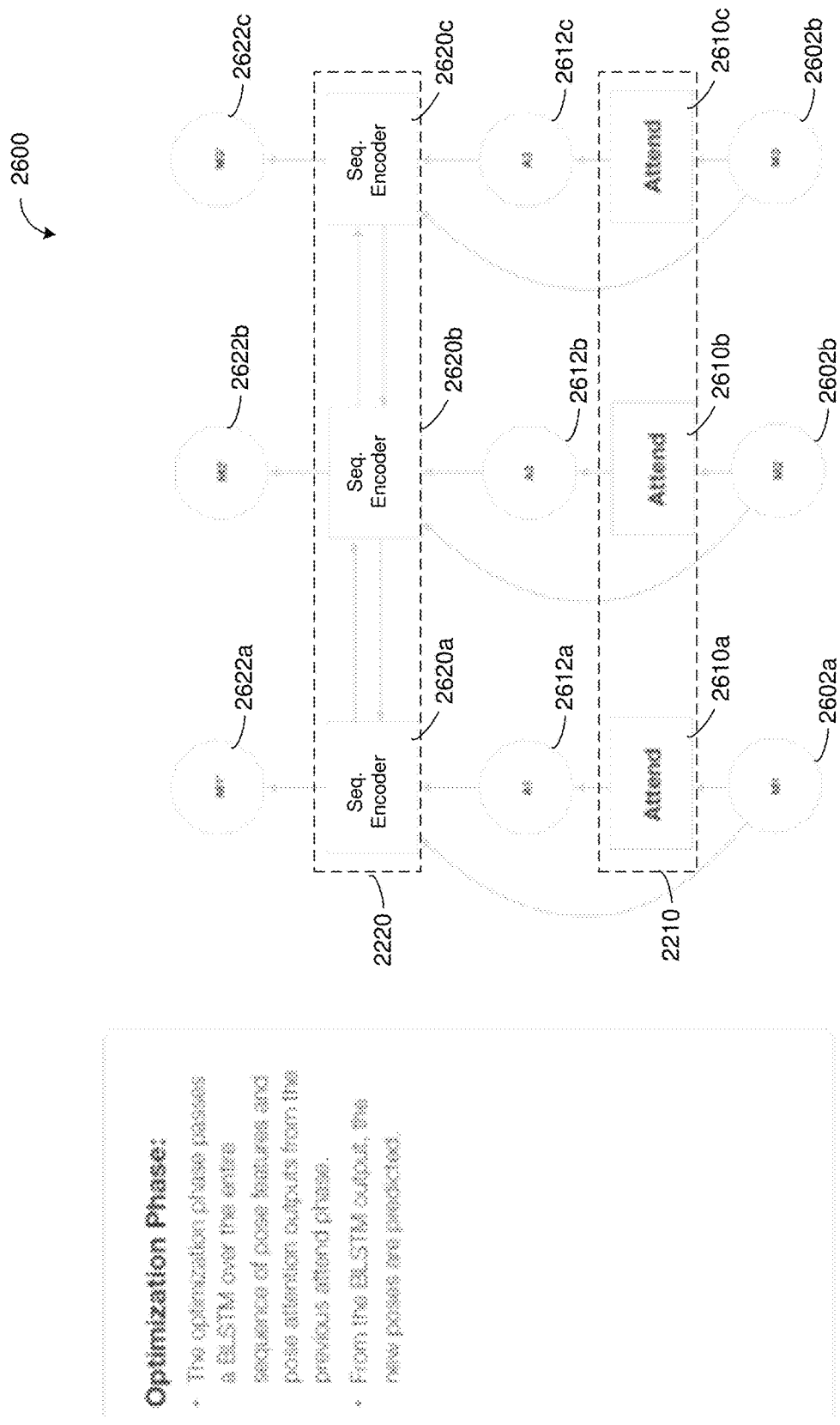
FIG. 26 illustrates an example optimization process in accordance with some implementations.

FIG. 26 illustrates an example optimization process 2600 in accordance with some implementations. As shown in FIG. 25, the vector 2612*a* is a result of the attention phase 2610*a* which combines meta pose estimations 2602*a*, 2602*b*, and 2602*c*. The corrected pose estimation 2622*a* is a result of the sequence encoder phase (e.g., a bidirectional long short-term memory (BLSTM) or a convolutional network) that takes the vector 2612*a* and the meta pose estimation 2602*a* as inputs. Similarly, the optimization process 2600 also generates corrected pose estimations 2622*b* and 2622*c*.

Figure 27:
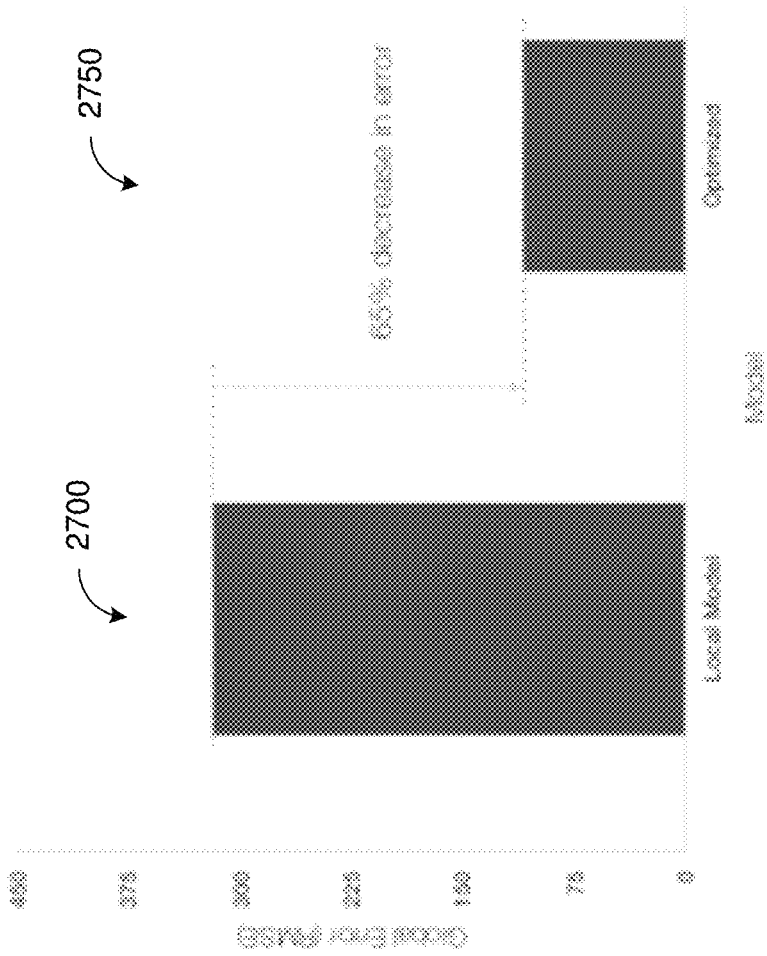
FIG. 27 illustrates example results of a local model versus results of a graph-optimized model 2750.

FIG. 27 illustrates example results of a local model 2700 versus results of a graph-optimized model 2750. As shown in FIG. 27, the graph-optimized model results in a 65% reduction in global error.

Figure 28:
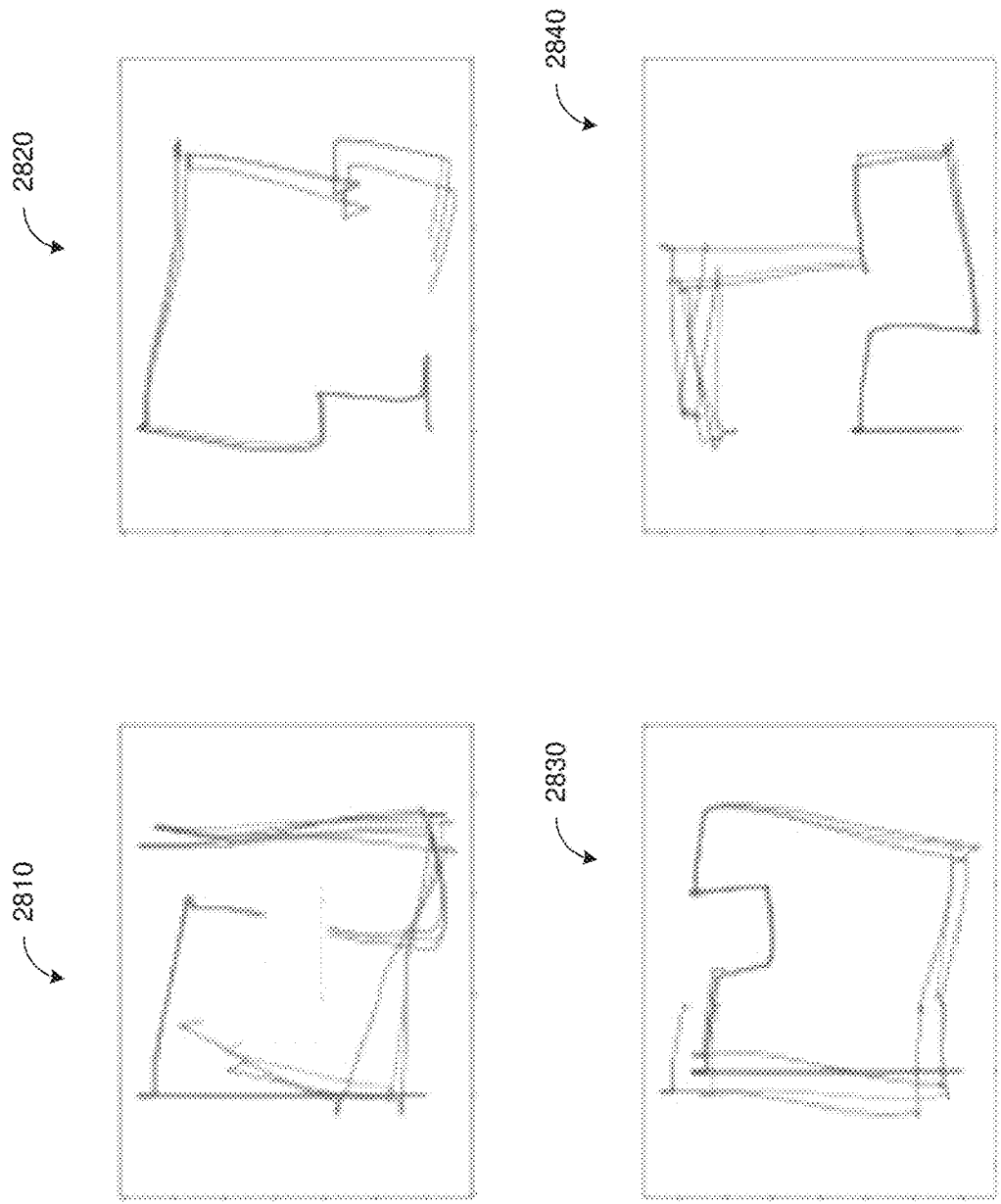
FIG. 28 illustrates example scenarios showing the ground-truth path against the predicted path using the local model and the predicted path using the optimized model in accordance with some implementations.

FIG. 28 illustrates example scenarios 2810, 2820, 2830, and 2840 showing the ground-truth path against the predicted path using the local model and the predicted path using the optimized model in accordance with some implementations.

Figure 29:
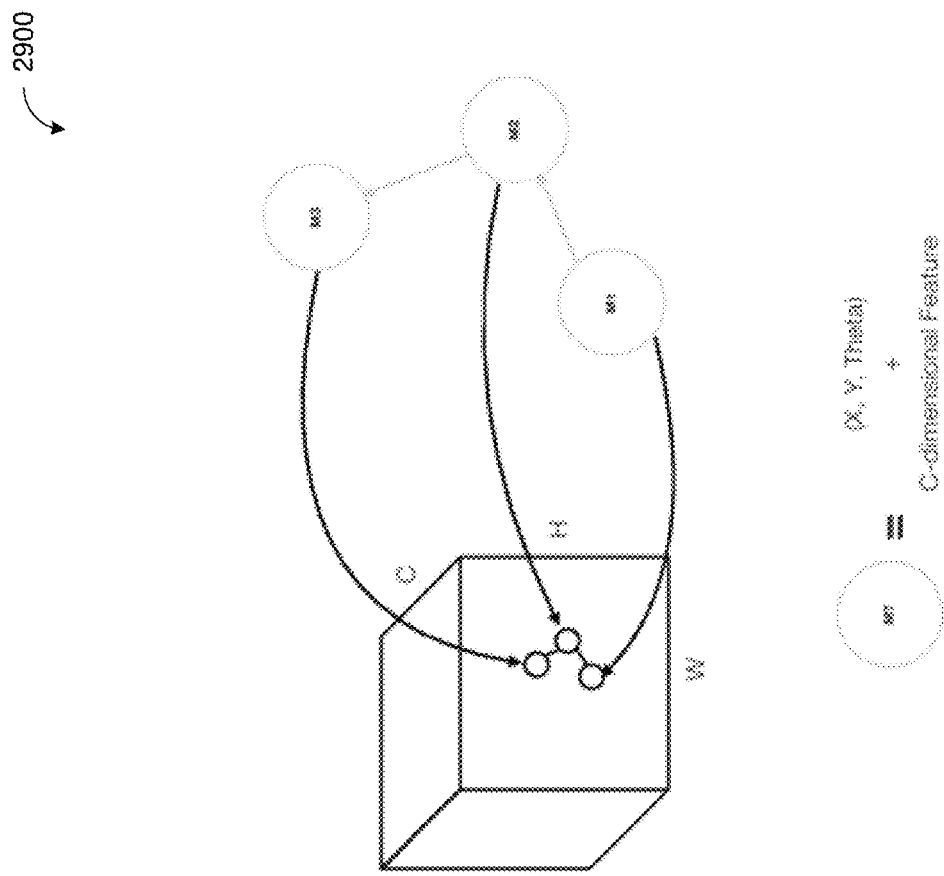
FIG. 29 illustrates a mapping process in accordance with some implementations.

FIG. 29 illustrates a mapping process 2900 in accordance with some implementations. According to some implementations, the map is function of a collection of pose estimations aggregated across time.

Figure 30:
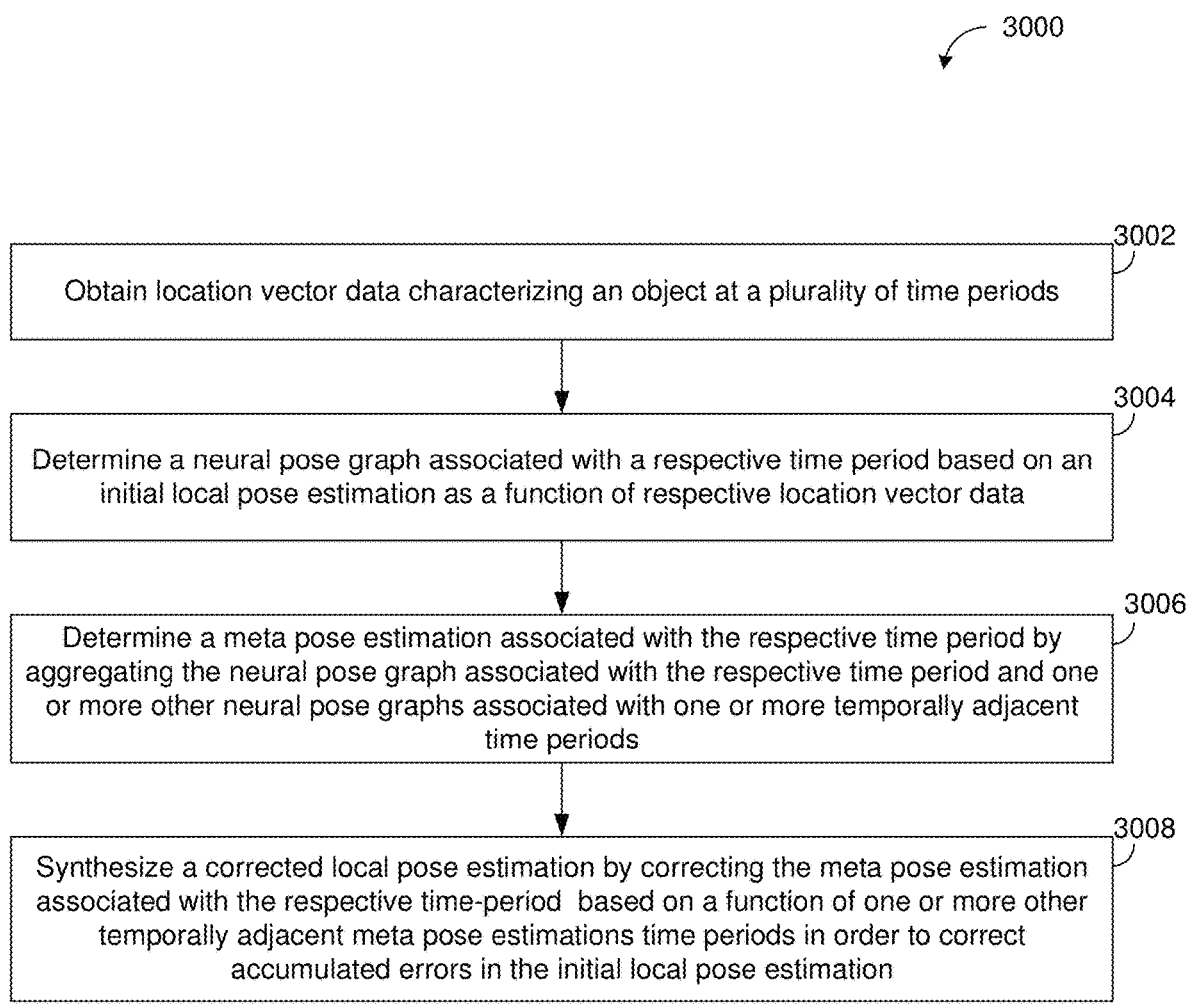
FIG. 30 is a flowchart representation of a method of a synthesizing a corrected pose estimation in accordance with some implementations.

FIG. 30 is a flowchart representation of a method 3000 of a synthesizing a corrected pose estimation in accordance with some implementations. In some implementations (and as detailed below as an example), the method 3000 is performed by a device with one or more processors and non-transitory memory. In some implementations, the method 3000 is performed by a device that includes: a locomotive system arranged to move the device; a control system coupled to the locomotive system provided to control the locomotive system in order to manage at least the velocity, acceleration or direction of the device; and a navigation controller (e.g., autonomous or semi-autonomous SLAM) coupled to the locomotive system and the control system, wherein the navigation controller is provided to orchestrate the locomotive system by way of the control system in order to move the device. For example, the device corresponds to an autonomous vehicle, robot, or the like that performs SLAM. In another example, the device corresponds to a SLAM controller node that instructs a vehicle, robot, or the like. In yet another example, the device corresponds to a head-mounted device (HMD) that performs SLAM for augmented reality (AR) or virtual reality (VR) applications.

In some implementations, the method 3000 is performed by processing logic, including hardware, firmware, software, or a combination thereof. In some implementations, the method 3000 is performed by a processor executing code stored in a non-transitory computer-readable medium (e.g., a memory).

The method 3000 begins, in block 3002, with the device obtaining location vector data characterizing an object (e.g., the device or some other object being tracked by the device) at a plurality of time-periods. In some implementations, the local vector data is synthesized from observation and action data. For example, the observation data corresponds to image data (e.g., RGB frames), depth data, GPS data, LiDAR data, and/or the like. For example, the action data corresponds to inertia/control data (e.g., steering controls (direction, bearing, altitude, attitude, etc.), throttle, torque, velocity, acceleration, thrust, etc.).

In various implementations, the location vector data corresponds to intrinsic information associated with (e.g., velocity, acceleration, torque, engine temperature, fuel levels, etc.) and extrinsic information characterizing at least one of environmental conditions or feedback (e.g., other objects and vehicles, ambient temperature, humidity, road conditions, etc.)

At block 3004, the device determines a neural pose graph associated with a respective time-period (e.g., the current time-period or reference epoch) based on an initial local pose estimation as a function of respective location vector data. In some implementations, the neural pose graph is determined based on a function of the initial local pose estimation associated with the respective time-period and features extracted from the location vector data.

At block 3006, the device determines a meta pose estimation associated with the respective time-period by aggregating the neural pose graph associated with the respective time-period and one or more other neural pose graphs associated with one or more temporally adjacent time-periods. In some implementations, the device performs the aggregation based on the neural pose graphs for the current and previous time-periods.

At block 3008, the device synthesizes a corrected pose estimation by correcting the meta pose estimation associated with the respective time-period based on a function of the meta pose estimation associated with the respective time-period and meta pose estimations associated with one or more temporally adjacent time-periods in order to correct accumulated errors in the initial local pose estimation. In some implementations, the corrected pose estimation satisfies a threshold deviation from the ground truth. In some implementations, the correction operation corresponds to soft attention and sequence encoder operations (e.g., BLSTM or convolutional network). In some implementations, the correction operation performs loop closures on the neural pose graphs. For example, the correction operation corrects for drift and global errors.

In various implementations, correcting the meta pose estimation associated with the respective time-period corresponds to performing at least one of (1) a soft attention operation on the meta pose estimation associated with the respective time-period and meta pose estimations associated with one or more temporally adjacent time-periods and (2) a sequence encoder operation on the meta pose estimation associated with the respective time-period and meta pose estimations associated with one or more temporally adjacent time-periods. In various implementations, the attention and sequence encoder operations are performed serially. In various implementations, the attention and sequence encoder operations are performed in parallel and the results are combined according to a predefined function.

In various implementations, the soft attention operation corresponds to a dot product function performed on the meta pose estimation associated with the respective time-period and meta pose estimations associated with one or more temporally adjacent time-periods. In various implementations, the soft attention operation corresponds to cosine similarity function performed on the meta pose estimation associated with the respective time-period and meta pose estimations associated with one or more temporally adjacent time-periods. In various implementations, the sequence encoder operation corresponds to a bidirectional long short-term memory (BLSTM) function performed on the meta pose estimation associated with the respective time-period and meta pose estimations associated with one or more temporally adjacent time-periods. In various implementations, the sequence encoder operation corresponds to convolutional network function performed on the meta pose estimation associated with the respective time-period and meta pose estimations associated with one or more temporally adjacent time-periods.

Figure 31:
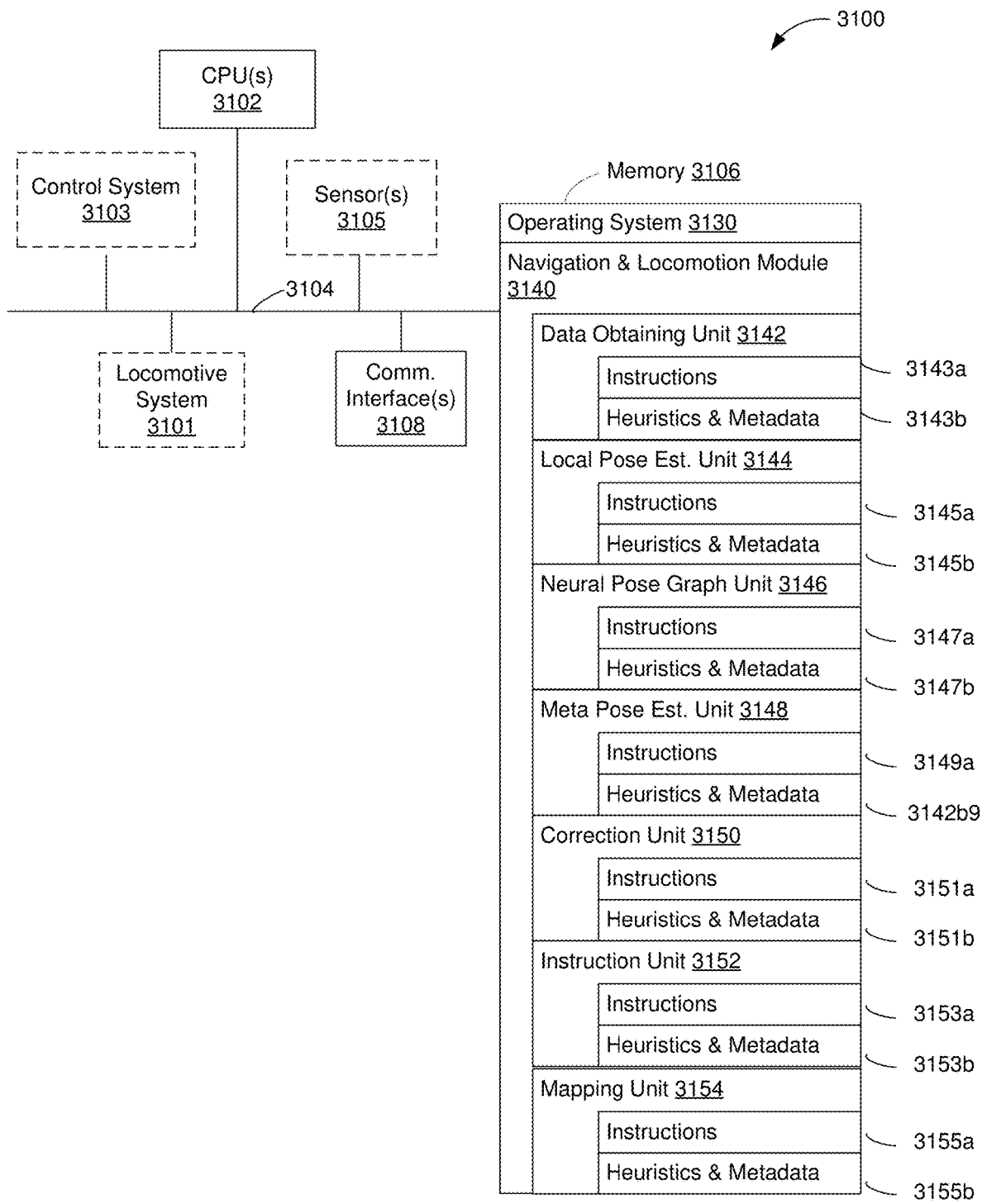
FIG. 31 is a block diagram of a device in accordance with some implementations.

In various implementations, the device further determines a local pose estimation (e.g., the locale of the device) associated with the respective time-period based on location vector data for the respective time-period and local pose estimations associated with one or more temporally adjacent time-periods. In various implementations, the device further maps the environment based on a collection of corrected pose estimations for the respective time-period and one or more temporally adjacent time-periods. In various implementations, the device relocalizes the object based on a collection of corrected pose estimations for the respective time-period and one or more temporally adjacent time-periods FIG. 31 is a block diagram of a device 3100 in accordance with some implementations. In some implementations, the device 3100 corresponds to a SLAM controller node, a vehicle, a robot, an HMD, or the like. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some implementations the device 3100 includes one or more processing units (CPUs) 3102 (e.g., processors), one or more communication interfaces 3108 (e.g., a network interface), a memory 3106, and one or more communication buses 3104 for interconnecting these and various other components.

In some implementations, the device 3100 optionally includes a locomotive system 3101 arranged to move the device and a control system 3103 provided to control the locomotive system in order to manage at least the velocity, acceleration or direction of the device. In some implementations, the locomotive system 3101 includes a powerplant (e.g., engine, electric motor, electromagnetic motor, etc.), drivetrain (e.g., transmission, drive shafts, differentials, etc.), and propulsion apparatus(es) (e.g., wheels, propeller, tracks, mechanical legs, etc.). In some implementations, at least a portion of the locomotive system 3101 is configured to transform stored energy to kinetic energy. In some implementations, the control system 3103 corresponds to steering/stability controls and velocity/acceleration controls (e.g., a throttle and/or clutch).

In some implementations, the device 3100 optionally includes one or more sensors 3105 provided to obtain (e.g., collect, receive, or retrieve) intrinsic information associated with the device (e.g., velocity, acceleration, torque, engine temperature, fuel levels, etc.) and extrinsic information characterizing at least one of environmental conditions or feedback (e.g., other objects and vehicles, ambient temperature, humidity, road conditions, etc.). For example, the one or more sensors 3105 correspond to (e.g., proximity sensors, IR sensors, image sensors, ultrasonic sensors, depth sensors, LiDAR, GPS, speedometer, accelerometer, torque sensor, photoresistor, humistor, temperature sensor, and/or the like.

In some implementations, the communication buses 3104 include circuitry that interconnects and controls communications between system components. The memory 3106 includes high-speed random-access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid-state storage devices. The memory 3106 optionally includes one or more storage devices remotely located from the CPU(s) 1302. The memory 3106 comprises a non-transitory computer readable storage medium. In some implementations, one or more instructions are included in a combination of logic and non-transitory memory. Moreover, in some implementations, the memory 3106 or the non-transitory computer readable storage medium of the memory 3106 stores the following programs, modules and data structures, or a subset thereof including an optional operating system 3130 and a navigation and locomotion module 3140.

The operating system 3130 includes procedures for handling various basic system services and for performing hardware dependent tasks.

In some implementations, the navigation and locomotion module 3140 is configured to perform SLAM and correct the estimations therefor. In some implementations, the navigation and locomotion module 3140 is configured to optionally instruct the control system 3102 to adjust at least one of the velocity, acceleration, or direction of the device based on the corrected SLAM estimations. To that end, the navigation and locomotion module 3140 includes a data obtaining unit 3142, a local pose estimation unit 3144, a neural pose graph unit 3146, a meta pose estimation unit 3148, a correction unit 3150, and an optional instruction unit 3152.

In some implementations, the data obtaining unit 3142 is configured to obtain location vector data characterizing an object (e.g., the device 3100 or some other object being tracked by the device 3100) at a plurality of time-periods. To that end, the data obtaining unit 3142 includes a set of instructions 3143a and heuristics and metadata 3143b.

In some implementations, the local pose estimation unit 3144 is configured to generate or determine a local pose estimation associated with a respective time-period (e.g., the current time-period or reference epoch). To that end, the local pose estimation unit 3144 includes a set of instructions 3145a and heuristics and metadata 3145b.

In some implementations, the neural pose graph unit 3146 is configured to generate or determine a neural pose graph associated with a respective time-period (e.g., the current time-period or reference epoch) based on the initial local pose estimation as a function of respective location vector data. To that end, the neural pose graph unit 3146 includes a set of instructions 3147a and heuristics and metadata 3147b.

In some implementations, the meta pose estimation unit 3148 is configured to generate or determine a meta pose estimation associated with the respective time-period by aggregating the neural pose graph associated with the respective time-period and one or more other neural pose graphs associated with one or more temporally adjacent time-periods. To that end, the meta pose estimation unit 3148 includes a set of instructions 3149*a* and heuristics and metadata 3149*b*.

In some implementations, the correction unit 3150 is configured to synthesizing a corrected pose estimation by correcting the meta pose estimation based on a function of the meta pose estimation associated with the respective time-period and meta pose estimations associated with one or more temporally adjacent time-periods in order to correct accumulated errors in the initial local pose estimation. For example, the correction unit 3150 includes an attention sub-unit that performs the attention 2210 in FIG. 22, and an optimization sub-unit that perform the optimization phase 2220 in FIG. 22. To that end, the correction unit 3150 includes a set of instructions 3151*a* and heuristics and metadata 3151*b*.

In some implementations, the optional instruction unit 3152 is configured to instruct the control system 3103 to adjust at least one of the velocity, acceleration, or direction of the device 3100 based on the corrected local pose estimation synthesized by the correction unit 3150. To that end, the instruction unit 3152 includes a set of instructions 3153*a* and heuristics and metadata 3153*b*.

In some implementations, the mapping unit 3154 is configured to map the environment based on a function of the local pose estimations and/or the corrected pose estimations. To that end, the mapping unit 3154 includes a set of instructions 3155*a* and heuristics and metadata 3155*b*.

Although the units comprising the navigation and locomotion modules 3140 are illustrated as residing on a single device 3100, it should be understood that in other embodiments, any combination of the units can reside in/on separate devices in various implementations.

Moreover, FIG. 31 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 31 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

Figure 32:
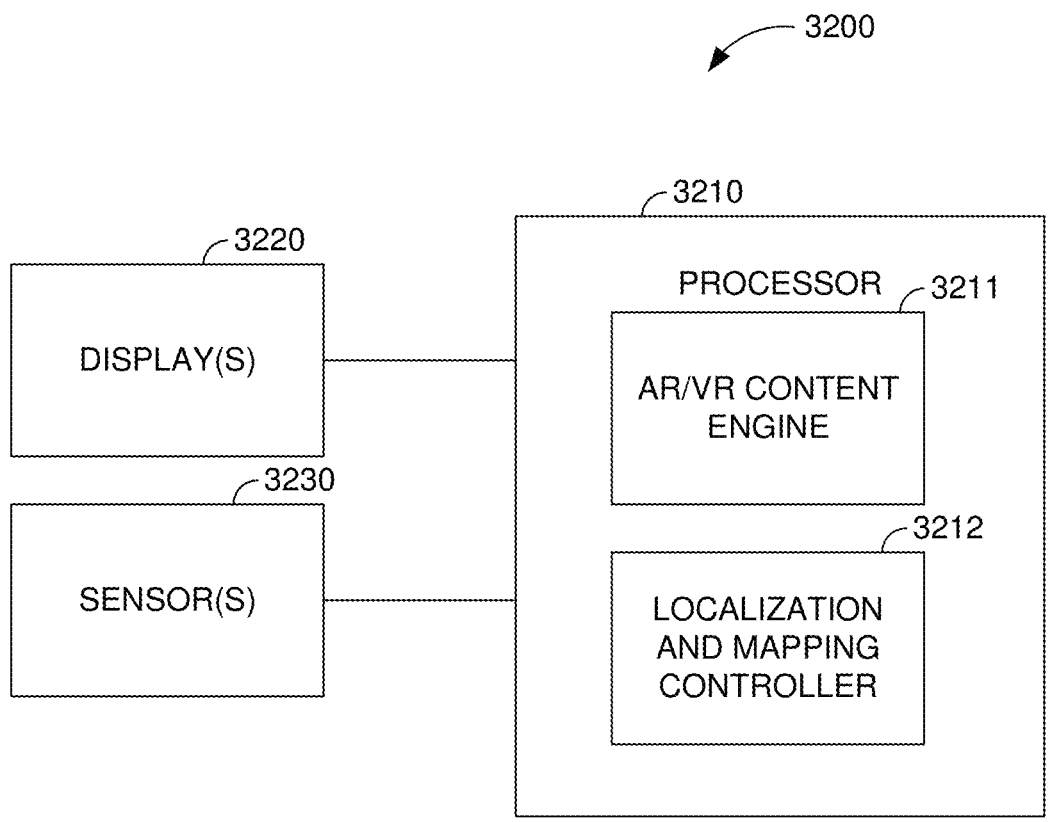
FIG. 32 is a block diagram of an AR/VR device in accordance with some implementations.

FIG. 32 is a block diagram of an augmented reality/virtual reality (AR/VR) device 3200 in accordance with some implementations. The AR/VR device 3200 (e.g., a head-mounted device (HMD) provided to present AR/VR content to a user) includes a processor 3210 coupled to one or more displays 3220 and one or more sensors 3230.

The one or more displays 3220 are provided to present AR/VR content. The one or more sensors includes one or more image sensors provided to capture image data. For example, in various implementations, the one or more image sensors capture image data of an eye of the user and the processor 3210 generates eye tracking information related to the user of the AR/VR device 3200 based on the image data. As another example, in various implementations, the one or more image sensors capture image data of an environment in which the user is operating the AR/VR device 3200 and the processor 3210 generates environmental data based on the image data.

The processor 3210 includes an AR/VR content engine 3211 coupled to the one or more displays, the AR/VR content engine to render AR/VR content for presentation by the one or more displays. The processor 3210 includes a localization and mapping controller 3212 coupled to the one or more image sensors and the AR/VR content engine. The localization and mapping controller 3212 is provided to synthesize a corrected pose estimation associated with a respective time-period by correcting a meta pose estimation associated with the respective time-period based on a function of meta pose estimations associated with one or more other temporally adjacent time-periods in order to correct accumulated errors in an initial local pose estimation associated with the respective time-period, wherein the meta pose estimation associated with the respective time is a function of a neural pose graph associated with the respective time-period and one or more other neural pose graphs associated with one or more temporally adjacent time-periods. The localization and mapping controller 3212 is further provided to instruct the AR/VR content engine to adjust the AR/VR content based on the corrected local pose estimation. In some implementations, the localization and mapping controller 3212 is configured to localize a user of the device in physical or virtual space and to map the physical or virtual space.

In various implementations, the localization and mapping controller 3212 is provided to obtain location vector data based on the image data characterizing the device at a plurality of time-periods, determine a neural pose graph associated with the respective time-period based on the initial local pose estimation as a function of the location vector data, and determine the meta pose estimation associated with the respective time-period by aggregating the neural pose graph associated with the respective time-period and one or more other neural pose graphs associated with one or more temporally adjacent time-periods.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
   at a device with one or more processors and non-transitory memory:
   obtaining location vector data characterizing an object;
   determining a neural pose graph associated with a respective time-period based on an initial local pose estimation as a function of respective location vector data;
   determining a meta pose estimation associated with the respective time-period by aggregating the neural pose graph associated with the respective time-period and one or more other neural pose graphs associated with one or more temporally adjacent time-periods; and
   synthesizing a corrected pose estimation by correcting the meta pose estimation associated with the respective time-period based on a function of the meta pose estimation associated with the respective time-period and meta pose estimations associated with one or more temporally adjacent time-periods in order to correct accumulated errors in the initial local pose estimation.

2. The method of claim 1 further comprising, determining a local pose estimation associated with the respective time-period based on location vector data for the respective time-period and local pose estimations associated with one or more temporally adjacent time-periods.

3. The method of claim 1, wherein the location vector data corresponds to intrinsic information associated with the device and extrinsic information characterizing at least one of environmental conditions or feedback.

4. The method of claim 1, wherein correcting the meta pose estimation associated with the respective time-period corresponds to performing:
   a soft attention operation on the meta pose estimation associated with the respective time-period and meta pose estimations associated with one or more temporally adjacent time-periods; and
   a sequence encoder operation on the meta pose estimation associated with the respective time-period and meta pose estimations associated with one or more temporally adjacent time-periods.

5. The method of claim 4, wherein the soft attention operation corresponds to a dot product function performed on the meta pose estimation associated with the respective time-period and meta pose estimations associated with one or more temporally adjacent time-periods.

6. The method of claim 4, wherein the soft attention operation corresponds to cosine similarity function performed on the meta pose estimation associated with the respective time-period and meta pose estimations associated with one or more temporally adjacent time-periods.

7. The method of claim 4, wherein the sequence encoder operation corresponds to a bidirectional long short-term memory (BLSTM) function performed on the meta pose estimation associated with the respective time-period and meta pose estimations associated with one or more temporally adjacent time-periods.

8. The method of claim 4, wherein the sequence encoder operation corresponds to convolutional network function performed on the meta pose estimation associated with the respective time-period and meta pose estimations associated with one or more temporally adjacent time-periods.

9. The method of claim 1 further comprising, mapping the environment based on a collection of corrected pose estimations for the respective time-period and one or more temporally adjacent time-periods.

10. The method of claim 1 further comprising, relocalizing the object based on a collection of corrected pose estimations for the respective time-period and one or more temporally adjacent time-periods.

11. A device comprising:
    a locomotive system arranged to move the device;
    a control system coupled to the locomotive system provided to control the locomotive system in order to manage at least the velocity, acceleration or direction of the device; and
    a navigation controller coupled to the locomotive system and the control system, wherein the navigation controller is provided to orchestrate the locomotive system by way of the control system in order to move the device, and wherein the navigation controller is provided to:
    synthesize a corrected pose estimation associated with a respective time-period by correcting a meta pose estimation associated with the respective time-period based on a function of meta pose estimations associated with one or more other temporally adjacent time-periods in order to correct accumulated errors in an initial local pose estimation associated with the respective time-period, wherein the meta pose estimation associated with the respective time is a function of a neural pose graph associated with the respective time-period and one or more other neural pose graphs associated with one or more temporally adjacent time-periods; and
    instruct the control system to adjust at least one of the velocity, acceleration, or direction of the device based on the corrected local pose estimation.

12. The device of claim 11 further comprising, a plurality of sensors provided to obtain intrinsic information associated with the device and extrinsic information characterizing at least one of environmental conditions or feedback.

13. The device of claim 11, wherein the navigation controller is provided to:

obtain location vector data from one or more sensors characterizing the device at a plurality of time-periods;

determine a neural pose graph associated with the respective time-period based on the initial local pose estimation as a function of the location vector data; and determine the meta pose estimation associated with the respective time-period by aggregating the neural pose graph associated with the respective time-period and one or more other neural pose graphs associated with one or more temporally adjacent time-periods.

14. The device of claim 11, wherein correcting the meta pose estimation associated with the respective time-period corresponds to performing:

a soft attention operation on the meta pose estimation associated with the respective time-period and meta pose estimations associated with one or more temporally adjacent time-periods; and a sequence encoder operation on the meta pose estimation associated with the respective time-period and meta pose estimations associated with one or more temporally adjacent time-periods.

15. The device of claim 11, wherein the navigation controller is provided to map the environment based on a collection of corrected pose estimations for the respective time-period and one or more temporally adjacent time-periods.

16. The device of claim 11, wherein the navigation controller is provided to relocalize the device based on a collection of corrected pose estimations for the respective time-period and one or more temporally adjacent time-periods.

17. A device comprising:

one or more displays provided to present augmented reality/virtual reality (AR/VR) content;

an AR/VR content engine coupled to the one or more displays, the AR/VR content engine to render AR/VR content for presentation by the one or more displays; and a localization and mapping controller coupled to the one or more image sensors and the AR/VR content engine, wherein the localization and mapping controller is provided to:

synthesize a corrected pose estimation associated with a respective time-period by correcting a meta pose estimation associated with the respective time-period based on a function of meta pose estimations associated with one or more other temporally adjacent time-periods in order to correct accumulated errors in an initial local pose estimation associated with the respective time-period, wherein the meta pose estimation associated with the respective time is a function of a neural pose graph associated with the respective time-period and one or more other neural pose graphs associated with one or more temporally adjacent time-periods; and instruct the AR/VR content engine to adjust the AR/VR content based on the corrected local pose estimation.

18. The device of claim 17 further comprising one or more image sensors provided to capture image data.

19. The device of claim 17, wherein localization and mapping controller is provided to:

obtain location vector data based on the image data characterizing the device at a plurality of time-periods;

determine a neural pose graph associated with the respective time-period based on the initial local pose estimation as a function of the location vector data; and determine the meta pose estimation associated with the respective time-period by aggregating the neural pose graph associated with the respective time-period and one or more other neural pose graphs associated with one or more temporally adjacent time-periods.

20. The device of claim 17, wherein correcting the meta pose estimation associated with the respective time-period corresponds to performing:

a soft attention operation on the meta pose estimation associated with the respective time-period and meta pose estimations associated with one or more temporally adjacent time-periods; and a sequence encoder operation on the meta pose estimation associated with the respective time-period and meta pose estimations associated with one or more temporally adjacent time-periods.

\* \* \* \* \*